(12) United States Patent
Zhang et al.

(10) Patent No.: US 12,196,925 B2
(45) Date of Patent: Jan. 14, 2025

(54) OPTICAL IMAGING LENS

(71) Applicant: GENIUS ELECTRONIC OPTICAL (XIAMEN) CO., LTD., Fujian (CN)

(72) Inventors: Jiayuan Zhang, Fujian (CN); Chuanbo Dong, Fujian (CN); Wei-Jeh Kao, Fujian (CN); Hung-Chien Hsieh, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 485 days.

(21) Appl. No.: 17/718,329

(22) Filed: Apr. 12, 2022

(65) Prior Publication Data

US 2023/0176331 A1 Jun. 8, 2023

(30) Foreign Application Priority Data

Dec. 8, 2021 (CN) .......................... 202111490340.3

(51) Int. Cl.
*G02B 9/64* (2006.01)
*G02B 13/00* (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS

| 2020/0073085 A1* | 3/2020 | Huang | G02B 9/64 |
| 2020/0209562 A1* | 7/2020 | Zhao | G02B 9/64 |
| 2021/0048647 A1* | 2/2021 | Park | G02B 9/64 |
| 2021/0223508 A1* | 7/2021 | Son | G02B 7/022 |

* cited by examiner

*Primary Examiner* — Christopher Stanford
*Assistant Examiner* — Journey F Sumlar
(74) *Attorney, Agent, or Firm* — JCIPRNET

(57) ABSTRACT

An optical imaging lens includes first to seventh lens elements sequentially arranged along an optical axis from an object side to an image side, and each including an object-side surface facing toward the object side and allowing an imaging ray to pass through and an image-side surface facing toward the image side and allowing the imaging ray to pass through. The first lens element has positive refracting power. The fourth lens element has positive refracting power. A periphery region of the object-side surface of the fourth lens element is convex. An optical axis region of the object-side surface of the sixth lens element is convex. An optical axis region of the image-side surface of the sixth lens element is concave. An optical axis region of the object-side of the seventh lens element is concave. Lens elements of the optical imaging lens are only the seven lens elements described above.

20 Claims, 21 Drawing Sheets

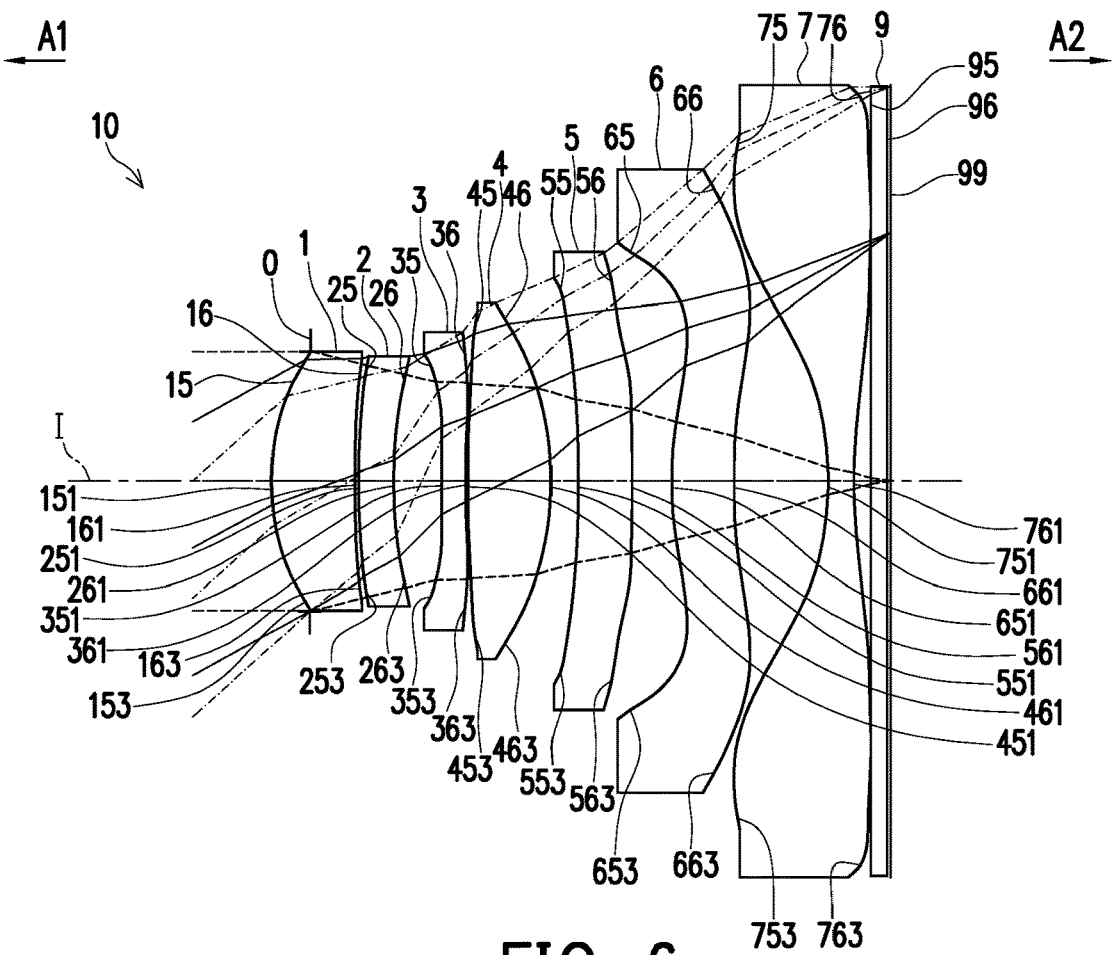
FIG. 6
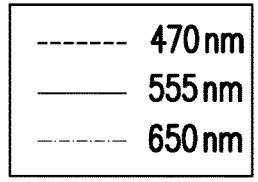
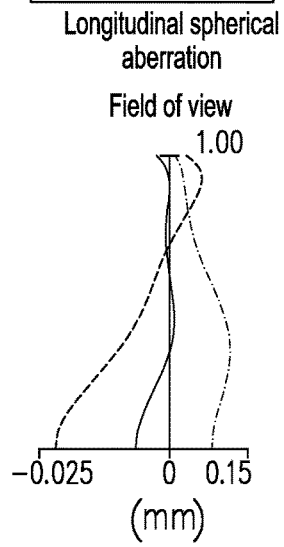
FIG. 7A
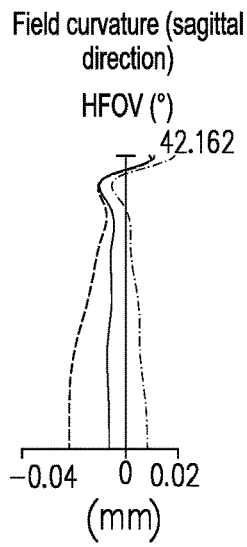
FIG. 7B
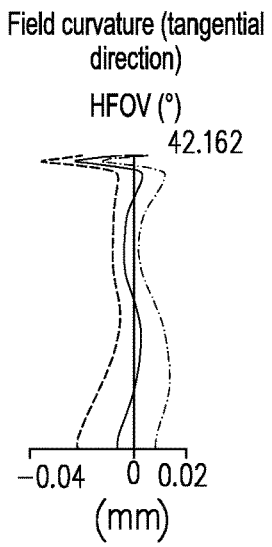
FIG. 7C
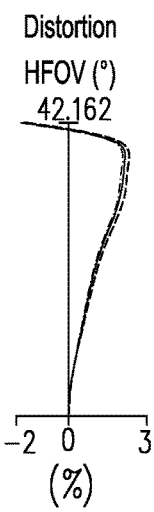
FIG. 7D

| First embodiment | | | | | | |
|---|---|---|---|---|---|---|
| EFL=5.718 mm, HFOV=42.162°, System length=7.961 mm, Fno=1.500, Image height=5.099 mm | | | | | | |
| Device | Surface | Radius of curvature (mm) | Thickness (mm) | Refractive index | Abbe number | Focal length (mm) |
| Object | | Infinity | Infinity | | | |
| Aperture 0 | | Infinity | -0.487 | | | |
| First lens element 1 | Object-side surface15 | 3.099 | 1.072 | 1.545 | 55.987 | 7.432 |
| | Image-side surface16 | 11.499 | 0.048 | | | |
| Second lens element 2 | Object-side surface25 | 8.224 | 0.456 | 1.661 | 20.373 | -36.256 |
| | Image-side surface26 | 6.001 | 0.625 | | | |
| Third lens element 3 | Object-side surface35 | 52.550 | 0.306 | 1.671 | 19.243 | -17.316 |
| | Image-side surface36 | 9.568 | 0.033 | | | |
| Fourth lens element 4 | Object-side surface45 | 17.924 | 1.072 | 1.545 | 55.987 | 6.906 |
| | Image-side surface46 | -4.677 | 0.348 | | | |
| Fifth lens element 5 | Object-side surface55 | -20.860 | 0.699 | 1.567 | 37.490 | -39.657 |
| | Image-side surface56 | -273.860 | 0.516 | | | |
| Sixth lens element 6 | Object-side surface65 | 4.443 | 0.808 | 1.567 | 37.490 | 14.031 |
| | Image-side surface66 | 9.340 | 1.221 | | | |
| Seventh lens element 7 | Object-side surface75 | -4.430 | 0.322 | 1.567 | 37.490 | -4.678 |
| | Image-side surface76 | 6.875 | 0.214 | | | |
| Filter 9 | Object-side surface95 | Infinity | 0.210 | 1.560 | 51.300 | |
| | Image-side surface96 | Infinity | 0.011 | | | |
| | Image plane 99 | Infinity | | | | |

FIG. 8

| Surface | K | $a_4$ | $a_6$ | $a_8$ | $a_{10}$ |
|---|---|---|---|---|---|
| 15 | 3.225656E-01 | -3.297062E-04 | 7.054290E-05 | 2.188426E-05 | -2.103761E-06 |
| 16 | 0.000000E+00 | -1.422493E-02 | 9.196041E-03 | -3.209847E-03 | 7.181758E-04 |
| 25 | 1.400357E+01 | -2.019306E-02 | 8.934309E-03 | -3.132464E-03 | 5.996730E-04 |
| 26 | 1.819099E+00 | -5.217487E-03 | 1.464030E-03 | 8.767672E-05 | -4.957497E-04 |
| 35 | 0.000000E+00 | -3.184741E-02 | 3.154491E-03 | -2.972973E-03 | 8.870208E-04 |
| 36 | 7.020644E+00 | -2.711287E-02 | 3.706043E-03 | -1.300689E-03 | 3.876235E-04 |
| 45 | 2.937727E+01 | -4.593799E-03 | -1.090877E-03 | 7.786164E-04 | 4.133565E-05 |
| 46 | -3.144130E+00 | -1.719765E-03 | -8.450132E-03 | 3.399193E-03 | -7.844148E-04 |
| 55 | -7.233898E+00 | 7.495151E-03 | -1.154683E-02 | 5.796360E-03 | -2.187392E-03 |
| 56 | 9.695091E+01 | -1.213047E-02 | -9.770617E-04 | 1.179049E-03 | -4.483208E-04 |
| 65 | -1.014916E+01 | -7.772468E-04 | -3.979042E-03 | 9.239162E-04 | -1.805103E-04 |
| 66 | 4.074843E+00 | 7.858002E-03 | -5.240460E-03 | 1.056927E-03 | -1.446785E-04 |
| 75 | -7.154783E-01 | -7.111719E-03 | -1.484476E-04 | 3.301901E-04 | -4.428144E-05 |
| 76 | 1.346764E-01 | -1.103816E-02 | 7.166665E-04 | 8.425151E-06 | -6.300407E-06 |
| Surface | $a_{12}$ | $a_{14}$ | $a_{16}$ | $a_{18}$ | $a_{20}$ |
| 15 | 9.013957E-07 | -8.274722E-07 | 2.802043E-07 | | |
| 16 | -8.991249E-05 | 1.578814E-05 | -8.873301E-07 | | |
| 25 | -2.096530E-05 | -4.325361E-07 | 4.504672E-07 | | |
| 26 | 2.833319E-04 | -7.334306E-05 | 9.422786E-06 | | |
| 35 | -2.190358E-04 | 5.230317E-05 | -4.213223E-06 | | |
| 36 | -6.314703E-05 | 1.323027E-05 | -1.350507E-06 | | |
| 45 | -7.451422E-05 | 1.384241E-05 | -8.082410E-07 | | |
| 46 | 1.646324E-04 | -2.548776E-05 | 1.680281E-06 | | |
| 55 | 6.867571E-04 | -1.506625E-04 | 2.035571E-05 | -1.521475E-06 | 4.821025E-08 |
| 56 | 1.185313E-04 | -1.887966E-05 | 1.681599E-06 | -7.834277E-08 | 1.532345E-09 |
| 65 | 2.409747E-05 | -2.272421E-06 | 1.443347E-07 | -6.417274E-09 | 2.026750E-10 |
| 66 | 1.321252E-05 | -7.854643E-07 | 2.950404E-08 | -6.283990E-10 | 5.276000E-12 |
| 75 | 2.991561E-06 | -1.216149E-07 | 3.036349E-09 | -4.248200E-11 | 2.360000E-13 |
| 76 | 5.866050E-07 | -2.919819E-08 | 8.497550E-10 | -1.301300E-11 | 7.100000E-14 |

FIG. 9

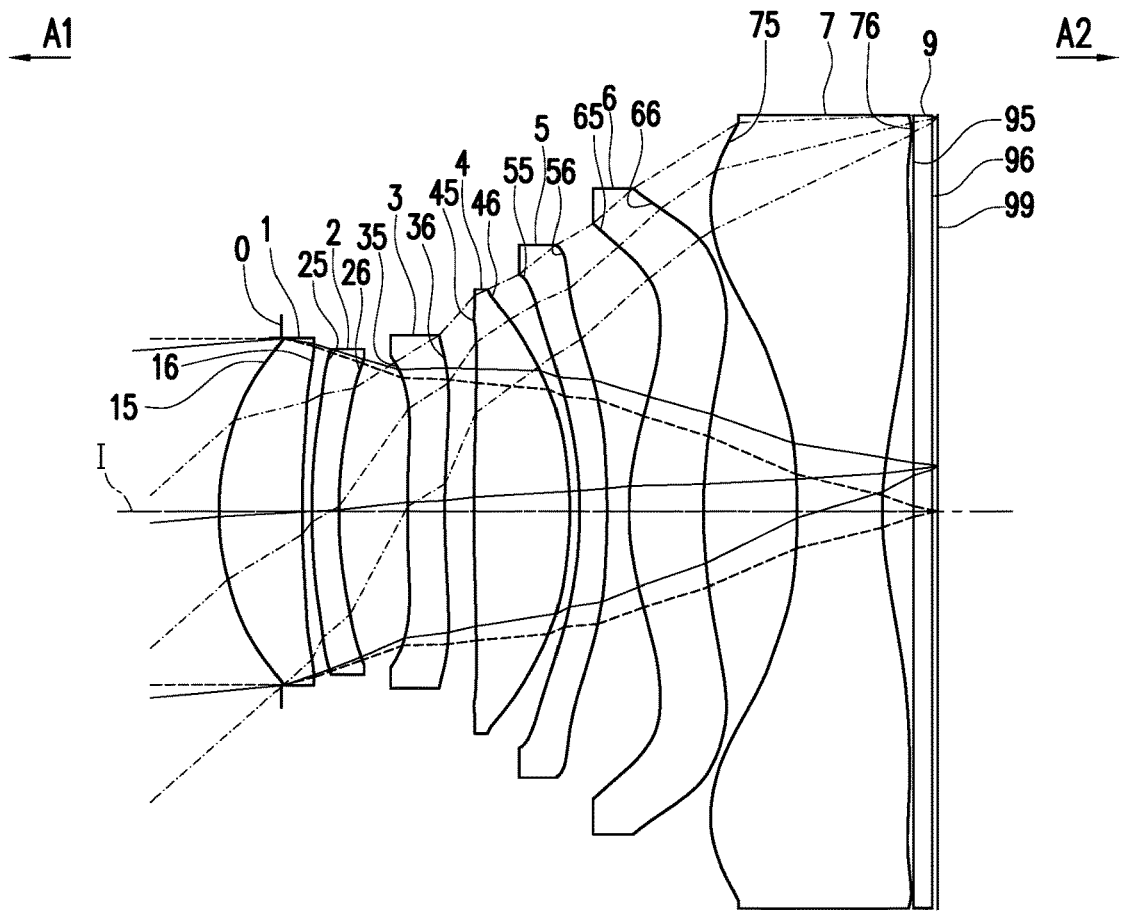
FIG. 10
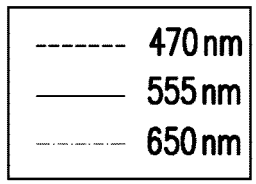
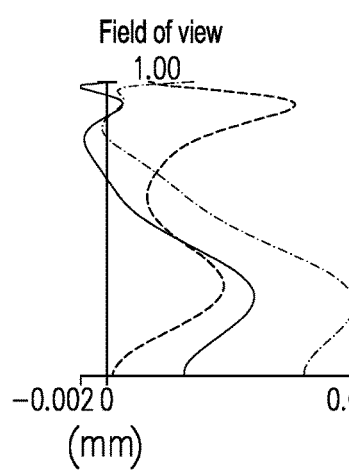
FIG. 11A
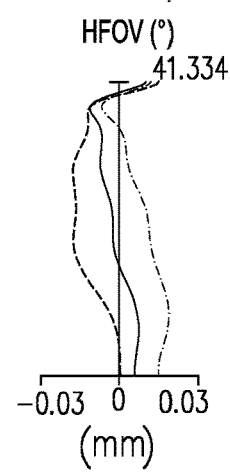
FIG. 11B
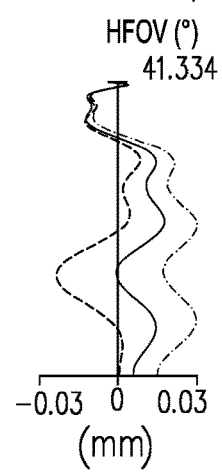
FIG. 11C
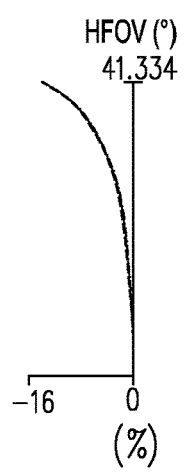
FIG. 11D

| Second embodiment ||||||
|---|---|---|---|---|---|
| EFL=5.949 mm, HFOV=41.334°, System length=8.181 mm, Fno=1.500, Image height=4.500 mm ||||||
| Device | Surface | Radius of curvature (mm) | Thickness (mm) | Refractive index | Abbe number | Focal length (mm) |
| Object | | Infinity | Infinity | | | |
| Aperture 0 | | Infinity | -0.704 | | | |
| First lens element 1 | Object-side surface15 | 3.081 | 0.937 | 1.545 | 55.987 | 7.788 |
| | Image-side surface16 | 9.976 | 0.108 | | | |
| Second lens element 2 | Object-side surface25 | 6.025 | 0.311 | 1.661 | 20.373 | -33.482 |
| | Image-side surface26 | 4.647 | 0.784 | | | |
| Third lens element 3 | Object-side surface35 | 10.234 | 0.418 | 1.671 | 19.243 | -54.344 |
| | Image-side surface36 | 7.876 | 0.340 | | | |
| Fourth lens element 4 | Object-side surface45 | 26.819 | 1.088 | 1.545 | 55.987 | 6.933 |
| | Image-side surface46 | -4.347 | 0.112 | | | |
| Fifth lens element 5 | Object-side surface55 | -4.509 | 0.311 | 1.671 | 19.243 | -9.292 |
| | Image-side surface56 | -16.338 | 0.256 | | | |
| Sixth lens element 6 | Object-side surface65 | 2.932 | 0.850 | 1.567 | 37.490 | 7.321 |
| | Image-side surface66 | 8.826 | 1.062 | | | |
| Seventh lens element 7 | Object-side surface75 | -7.715 | 0.971 | 1.567 | 37.490 | -4.371 |
| | Image-side surface76 | 3.847 | 0.359 | | | |
| Filter 9 | Object-side surface95 | Infinity | 0.210 | 1.560 | 51.300 | |
| | Image-side surface96 | Infinity | 0.061 | | | |
| | Image plane 99 | Infinity | | | | |

FIG. 12

| Surface | K | $a_4$ | $a_6$ | $a_8$ | $a_{10}$ |
|---|---|---|---|---|---|
| 15 | 3.353129E-01 | -3.757475E-04 | 2.647756E-04 | -2.244646E-04 | 1.058910E-04 |
| 16 | 8.342292E+00 | -1.512804E-02 | 1.024645E-02 | -4.132977E-03 | 9.549037E-04 |
| 25 | 6.874863E+00 | -3.093627E-02 | 1.333711E-02 | -4.358399E-03 | 6.930511E-04 |
| 26 | -4.613344E+00 | -1.139058E-02 | 5.440710E-03 | -2.318562E-04 | -7.373473E-04 |
| 35 | 7.796582E+00 | -2.721414E-02 | 1.109176E-03 | -2.033585E-03 | 2.094184E-04 |
| 36 | 1.072612E+01 | -2.324596E-02 | 2.697382E-03 | -1.963172E-03 | 4.018783E-04 |
| 45 | 9.503356E+00 | -6.263564E-03 | 2.194848E-03 | -1.135881E-03 | 6.817776E-04 |
| 46 | -2.622119E+00 | 1.334206E-02 | -2.367690E-02 | 1.036006E-02 | -2.395951E-03 |
| 55 | -1.220403E+01 | 1.851585E-02 | -2.640555E-02 | 1.232684E-02 | -3.172256E-03 |
| 56 | 2.669376E+01 | -2.431293E-02 | 4.429012E-03 | 2.713553E-06 | -1.220942E-04 |
| 65 | -5.046781E+00 | -1.080790E-02 | 4.320090E-03 | -3.734292E-03 | 1.652650E-03 |
| 66 | 1.417160E+00 | 2.746635E-02 | -1.566288E-02 | 4.201871E-03 | -7.724180E-04 |
| 75 | -4.551273E+01 | -2.759009E-02 | 3.581241E-03 | -2.688357E-04 | 3.042833E-05 |
| 76 | -9.659708E-01 | -2.826801E-02 | 5.122482E-03 | -8.104355E-04 | 1.002545E-04 |
| Surface | $a_{12}$ | $a_{14}$ | $a_{16}$ | $a_{18}$ | $a_{20}$ |
| 15 | -3.214468E-05 | 5.582684E-06 | -5.703692E-07 | -3.308529E-08 | -2.606501E-09 |
| 16 | -1.319337E-04 | 5.328307E-06 | 7.456652E-07 | -6.335423E-08 | 4.425426E-09 |
| 25 | -2.980674E-05 | -9.536800E-06 | 1.980135E-06 | 7.660019E-08 | -1.553307E-08 |
| 26 | 3.244612E-04 | -5.823743E-05 | 4.814272E-06 | -2.030849E-07 | 8.542452E-08 |
| 35 | 8.660313E-05 | -4.812017E-05 | 9.888663E-06 | -5.517799E-07 | 3.280090E-08 |
| 36 | -6.604725E-06 | -1.802550E-05 | 3.963131E-06 | 6.691103E-08 | -5.187424E-08 |
| 45 | -2.353040E-04 | 3.740270E-05 | -2.347628E-06 | 1.226679E-08 | 2.412076E-09 |
| 46 | 3.559062E-04 | -3.721629E-05 | 2.115297E-06 | -4.417144E-09 | -2.006333E-09 |
| 55 | 5.066899E-04 | -4.832306E-05 | 2.025949E-06 | 5.264035E-08 | -6.642790E-09 |
| 56 | 3.899781E-06 | 8.648323E-06 | -1.967510E-06 | 1.681634E-07 | -5.179932E-09 |
| 65 | -4.389123E-04 | 7.169088E-05 | -7.050640E-06 | 3.808108E-07 | -8.618034E-09 |
| 66 | 9.596443E-05 | -7.887009E-06 | 4.073645E-07 | -1.193287E-08 | 1.521640E-10 |
| 75 | -3.339000E-06 | 2.262231E-07 | -8.914877E-09 | 1.924110E-10 | -1.783000E-12 |
| 76 | -9.077581E-06 | 5.615408E-07 | -2.185728E-08 | 4.769080E-10 | -4.450000E-12 |

FIG. 13

| Third embodiment | | | | | | |
|---|---|---|---|---|---|---|
| EFL=3.590 mm, HFOV=42.800°, System length=5.795 mm, Fno=1.700, Image height=3.414 mm | | | | | | |
| Device | Surface | Radius of curvature (mm) | Thickness (mm) | Refractive index | Abbe number | Focal length (mm) |
| Object | | Infinity | Infinity | | | |
| Aperture 0 | | Infinity | -0.173 | | | |
| First lens element 1 | Object-side surface15 | 2.790 | 0.697 | 1.545 | 55.987 | 8.187 |
| | Image-side surface16 | 6.762 | 0.170 | | | |
| Second lens element 2 | Object-side surface25 | 3.875 | 0.277 | 1.661 | 20.373 | 50.000 |
| | Image-side surface26 | 4.259 | 0.454 | | | |
| Third lens element 3 | Object-side surface35 | 5.428 | 0.332 | 1.671 | 19.243 | 49.997 |
| | Image-side surface36 | 6.303 | 0.099 | | | |
| Fourth lens element 4 | Object-side surface45 | 145.008 | 1.172 | 1.545 | 55.987 | 4.740 |
| | Image-side surface46 | -2.629 | 0.029 | | | |
| Fifth lens element 5 | Object-side surface55 | -10.795 | 0.305 | 1.671 | 19.243 | 15.083 |
| | Image-side surface56 | -5.309 | 0.190 | | | |
| Sixth lens element 6 | Object-side surface65 | 116.168 | 0.581 | 1.671 | 19.243 | -10.130 |
| | Image-side surface66 | 6.468 | 0.944 | | | |
| Seventh lens element 7 | Object-side surface75 | -1.386 | 0.236 | 1.567 | 37.490 | 5.157 |
| | Image-side surface76 | -1.000 | 0.050 | | | |
| Filter 9 | Object-side surface95 | Infinity | 0.210 | 1.560 | 51.300 | |
| | Image-side surface96 | Infinity | 0.049 | | | |
| | Image plane 99 | Infinity | | | | |

FIG. 16

| Surface | K | $a_4$ | $a_6$ | $a_8$ | $a_{10}$ |
|---|---|---|---|---|---|
| 15 | -3.467059E-02 | -6.313741E-03 | -1.236470E-03 | -7.811498E-04 | -6.173205E-04 |
| 16 | 0.000000E+00 | -2.522523E-02 | 5.524082E-03 | -4.221528E-03 | 5.510813E-04 |
| 25 | 1.249056E-01 | -2.487869E-02 | 8.479448E-03 | -3.841867E-03 | -9.075155E-05 |
| 26 | -4.908734E-02 | -8.056013E-03 | 4.562321E-04 | -2.708302E-04 | -7.356192E-04 |
| 35 | 0.000000E+00 | -3.218443E-02 | 2.883810E-04 | -3.238052E-03 | 6.484585E-04 |
| 36 | -1.985579E+00 | -2.796386E-02 | 2.880969E-03 | -1.113073E-03 | 3.491978E-04 |
| 45 | 9.899946E+01 | -3.888806E-03 | 1.302726E-05 | 9.590983E-04 | 5.879423E-05 |
| 46 | -1.375199E+00 | -1.116387E-02 | -1.058209E-02 | 3.237330E-03 | -8.191830E-04 |
| 55 | 2.903667E+01 | -2.061277E-03 | -1.295008E-02 | 5.839759E-03 | -2.204521E-03 |
| 56 | -5.775145E+01 | -1.065395E-02 | -4.634072E-04 | 1.238148E-03 | -4.306309E-04 |
| 65 | 9.900000E+01 | -6.998473E-03 | -6.417180E-03 | 8.817984E-04 | -1.549632E-04 |
| 66 | -9.899994E+01 | -6.844006E-03 | -4.824897E-03 | 1.058737E-03 | -1.461772E-04 |
| 75 | -1.813783E+00 | 1.924375E-04 | 1.562383E-04 | 3.584060E-04 | -4.302760E-05 |
| 76 | -9.900000E+01 | 3.369448E-03 | -3.807624E-04 | 1.175896E-07 | -4.931207E-06 |
| Surface | $a_{12}$ | $a_{14}$ | $a_{16}$ | $a_{18}$ | $a_{20}$ |
| 15 | 7.592646E-05 | 4.550534E-04 | -3.007074E-04 | -4.198013E-06 | 6.688953E-05 |
| 16 | -2.887028E-04 | -1.508937E-05 | 4.329272E-04 | -2.413762E-05 | 3.150436E-05 |
| 25 | -2.750531E-04 | 5.742802E-05 | 3.332071E-04 | 3.232790E-06 | -3.151583E-05 |
| 26 | 5.905400E-05 | -1.810438E-04 | 5.865749E-05 | -4.545673E-06 | 8.887131E-06 |
| 35 | -3.385900E-04 | -3.704865E-06 | -1.732071E-05 | -1.060211E-06 | -1.511048E-06 |
| 36 | -6.590716E-05 | 2.075583E-05 | 2.824491E-06 | 1.706471E-07 | 4.087542E-07 |
| 45 | -7.541717E-05 | 1.416017E-05 | -1.087730E-06 | 6.353694E-07 | -2.067432E-07 |
| 46 | 1.565836E-04 | -2.542619E-05 | 1.873973E-06 | -1.997449E-07 | -1.178990E-08 |
| 55 | 6.817906E-04 | -1.514777E-04 | 2.022362E-05 | -1.563908E-06 | 2.987589E-08 |
| 56 | 1.221453E-04 | -1.823601E-05 | 1.719370E-06 | -9.255021E-08 | -7.650831E-09 |
| 65 | 2.950738E-05 | -1.275689E-06 | 3.398816E-07 | -4.477121E-08 | 8.186196E-09 |
| 66 | 1.319986E-05 | -7.612578E-07 | 2.549240E-08 | -9.325900E-10 | 1.971260E-10 |
| 75 | 3.008397E-06 | -1.261003E-07 | 1.638598E-09 | -3.338530E-10 | -4.968300E-11 |
| 76 | 6.898701E-07 | -2.530720E-08 | 7.150940E-10 | -4.033500E-11 | -1.486000E-12 |

FIG. 17

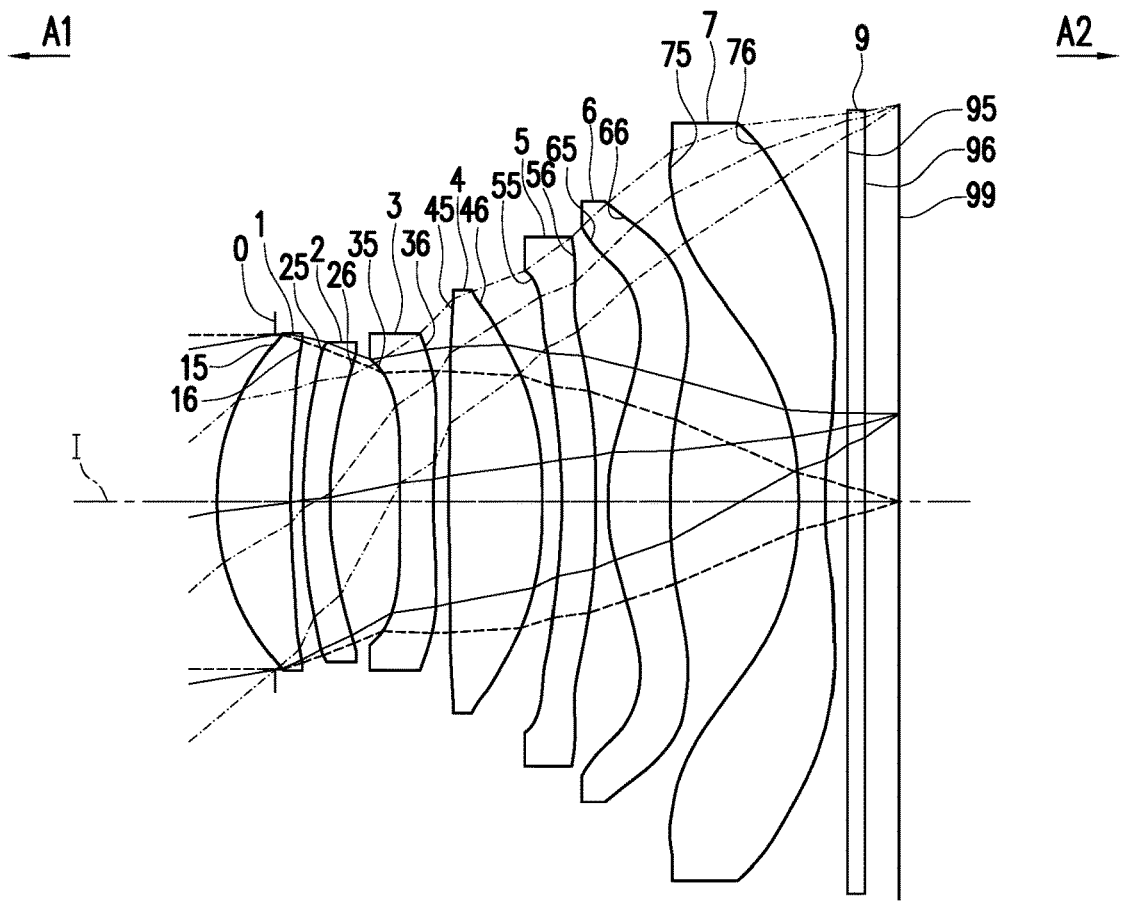
FIG. 18
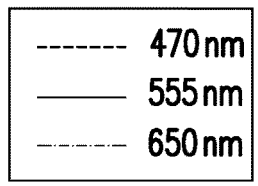
FIG. 19A  FIG. 19B  FIG. 19C  FIG. 19D
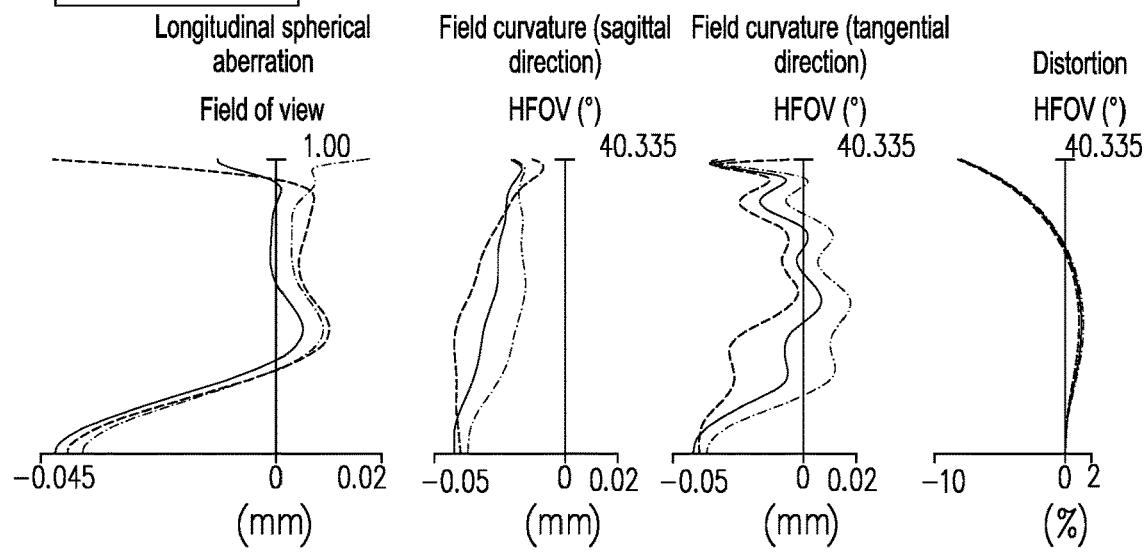

| Fourth embodiment | | | | | | |
|---|---|---|---|---|---|---|
| EFL=5.912 mm, HFOV=40.335°, System length=8.011 mm, Fno=1.500, Image height=4.672 mm | | | | | | |
| Device | Surface | Radius of curvature (mm) | Thickness (mm) | Refractive index | Abbe number | Focal length (mm) |
| Object | | Infinity | Infinity | | | |
| Aperture 0 | | Infinity | -0.679 | | | |
| First lens element 1 | Object-side surface15 | 3.014 | 0.859 | 1.545 | 55.987 | 7.373 |
| | Image-side surface16 | 10.773 | 0.149 | | | |
| Second lens element 2 | Object-side surface25 | 5.335 | 0.315 | 1.661 | 20.373 | -30.352 |
| | Image-side surface26 | 4.123 | 0.821 | | | |
| Third lens element 3 | Object-side surface35 | 24.560 | 0.399 | 1.671 | 19.243 | -16.175 |
| | Image-side surface36 | 7.528 | 0.182 | | | |
| Fourth lens element 4 | Object-side surface45 | 18.868 | 1.102 | 1.545 | 55.987 | 8.086 |
| | Image-side surface46 | -5.648 | 0.223 | | | |
| Fifth lens element 5 | Object-side surface55 | -5.774 | 0.397 | 1.671 | 19.243 | -10.926 |
| | Image-side surface56 | -26.978 | 0.153 | | | |
| Sixth lens element 6 | Object-side surface65 | 2.415 | 0.735 | 1.567 | 37.533 | 5.428 |
| | Image-side surface66 | 9.813 | 1.506 | | | |
| Seventh lens element 7 | Object-side surface75 | -5.150 | 0.315 | 1.567 | 37.533 | -4.521 |
| | Image-side surface76 | 5.269 | 0.251 | | | |
| Filter 9 | Object-side surface95 | Infinity | 0.210 | 1.560 | 51.300 | |
| | Image-side surface96 | Infinity | 0.395 | | | |
| | Image plane 99 | Infinity | | | | |

FIG. 20

| Surface | K | $a_4$ | $a_6$ | $a_8$ | $a_{10}$ |
|---|---|---|---|---|---|
| 15 | 3.537896E-01 | -9.467183E-04 | 8.293767E-04 | -3.954327E-04 | 1.109517E-04 |
| 16 | 0.000000E+00 | -1.322402E-02 | 9.892922E-03 | -4.166758E-03 | 1.009521E-03 |
| 25 | 5.961670E+00 | -3.329110E-02 | 1.306631E-02 | -4.522024E-03 | 7.657753E-04 |
| 26 | -3.197843E+00 | -1.246612E-02 | 4.138535E-03 | 6.553106E-04 | -8.837660E-04 |
| 35 | 0.000000E+00 | -4.336368E-02 | 3.929094E-03 | -3.279990E-03 | 3.569244E-04 |
| 36 | -2.541264E+01 | -2.954860E-02 | 4.072652E-03 | -1.820076E-03 | 4.370731E-04 |
| 45 | 1.464300E+00 | -1.123597E-02 | 3.421143E-03 | -1.146528E-03 | 6.554925E-04 |
| 46 | -1.250019E+00 | 6.609492E-03 | -2.244956E-02 | 1.040842E-02 | -2.407038E-03 |
| 55 | -5.670882E+01 | 2.557371E-02 | -2.798412E-02 | 1.246160E-02 | -3.158335E-03 |
| 56 | 2.630428E+01 | -1.947555E-02 | 3.490703E-03 | 5.152926E-05 | -1.123629E-04 |
| 65 | -6.705392E+00 | -5.045506E-03 | 2.700320E-03 | -3.604955E-03 | 1.643570E-03 |
| 66 | 2.642343E+00 | 2.865369E-02 | -1.642768E-02 | 4.261801E-03 | -7.724795E-04 |
| 75 | -1.679753E+00 | -2.667018E-02 | 3.693205E-03 | -2.706556E-04 | 3.024722E-05 |
| 76 | -4.218104E-01 | -3.091156E-02 | 5.238174E-03 | -8.159885E-04 | 1.006334E-04 |
| Surface | $a_{12}$ | $a_{14}$ | $a_{16}$ | $a_{18}$ | $a_{20}$ |
| 15 | -2.328510E-05 | 6.594559E-06 | -9.811566E-07 | -2.005145E-07 | 3.399793E-08 |
| 16 | -1.203788E-04 | 3.377803E-06 | -3.611666E-07 | -1.360038E-07 | 7.147762E-08 |
| 25 | -1.902868E-05 | -1.357904E-05 | 5.369521E-07 | 1.870581E-08 | 8.527283E-08 |
| 26 | 2.728209E-04 | -4.865310E-05 | 9.104268E-06 | -1.573893E-06 | 1.274731E-07 |
| 35 | 1.472992E-04 | -5.911818E-05 | 2.681720E-06 | 1.454856E-06 | -1.154620E-07 |
| 36 | -1.823007E-05 | -2.177858E-05 | 4.672894E-06 | 3.972166E-07 | -1.015294E-07 |
| 45 | -2.332366E-04 | 3.799024E-05 | -2.377880E-06 | -3.025514E-09 | 3.863890E-09 |
| 46 | 3.554768E-04 | -3.734673E-05 | 2.091216E-06 | -4.151620E-09 | -8.580450E-10 |
| 55 | 5.049570E-04 | -4.868177E-05 | 2.027832E-06 | 5.807142E-08 | -6.813139E-09 |
| 56 | 3.417848E-06 | 8.484766E-06 | -1.969838E-06 | 1.697345E-07 | -5.192900E-09 |
| 65 | -4.387941E-04 | 7.177580E-05 | -7.048340E-06 | 3.803710E-07 | -8.624518E-09 |
| 66 | 9.595545E-05 | -7.891004E-06 | 4.067143E-07 | -1.196545E-08 | 1.583910E-10 |
| 75 | -3.343421E-06 | 2.262412E-07 | -8.916109E-09 | 1.921020E-10 | -1.730000E-12 |
| 76 | -9.084420E-06 | 5.606859E-07 | -2.188187E-08 | 4.772850E-10 | -4.362000E-12 |

FIG. 21

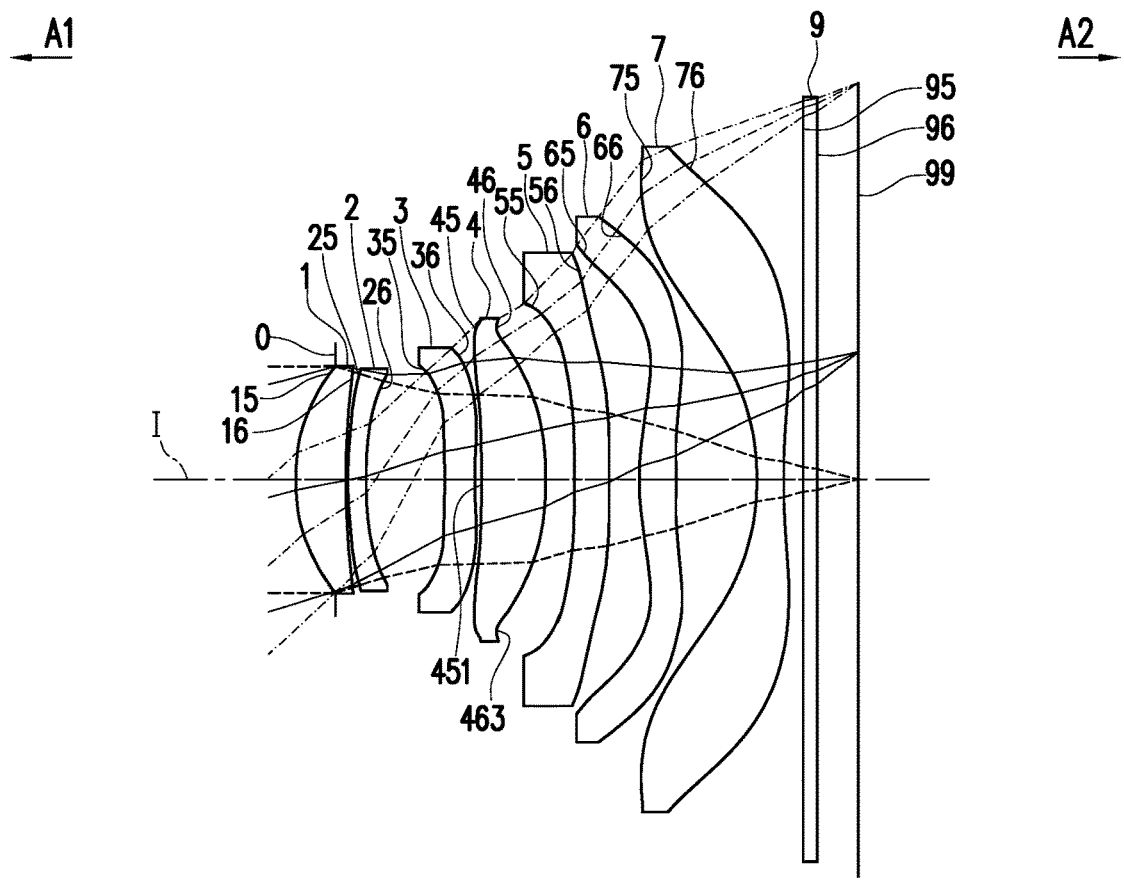
FIG. 22
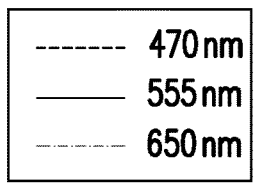
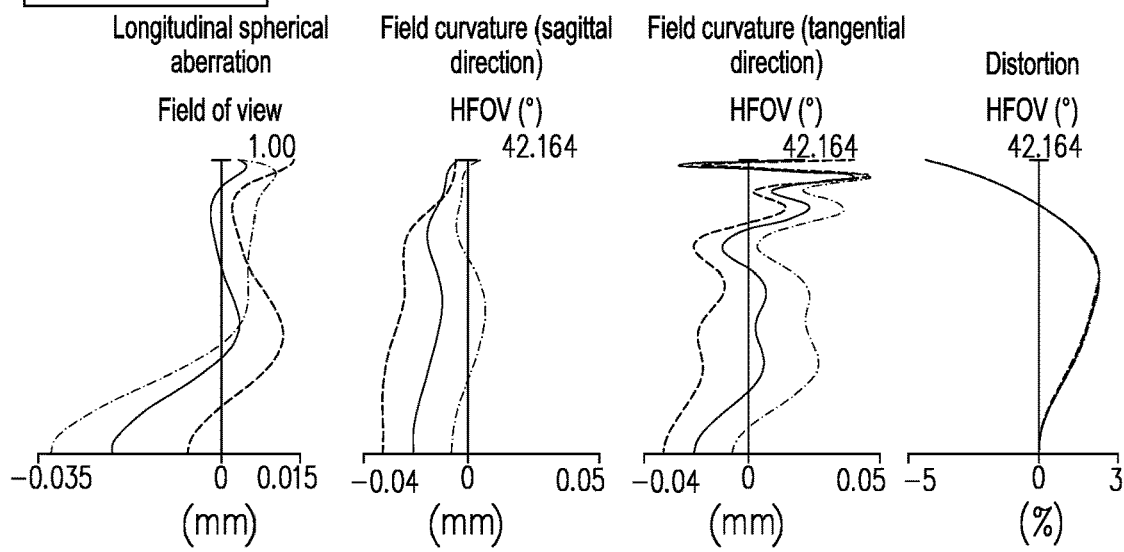
FIG. 23A   FIG. 23B   FIG. 23C   FIG. 23D

| Fifth embodiment | | | | | | |
|---|---|---|---|---|---|---|
| EFL=6.888 mm, HFOV=42.164°, System length=8.508 mm, Fno=2.000, Image height=6.000 mm | | | | | | |
| Device | Surface | Radius of curvature (mm) | Thickness (mm) | Refractive index | Abbe number | Focal length (mm) |
| Object | | Infinity | Infinity | | | |
| Aperture 0 | | Infinity | -0.589 | | | |
| First lens element 1 | Object-side surface15 | 2.897 | 0.755 | 1.545 | 55.987 | 7.147 |
| | Image-side surface16 | 10.189 | 0.029 | | | |
| Second lens element 2 | Object-side surface25 | 7.020 | 0.278 | 1.661 | 20.373 | -29.246 |
| | Image-side surface26 | 5.081 | 1.188 | | | |
| Third lens element 3 | Object-side surface35 | 183.280 | 0.463 | 1.671 | 19.243 | -22.521 |
| | Image-side surface36 | 14.072 | 0.102 | | | |
| Fourth lens element 4 | Object-side surface45 | -29.922 | 0.972 | 1.545 | 55.987 | 9.272 |
| | Image-side surface46 | -4.381 | 0.423 | | | |
| Fifth lens element 5 | Object-side surface55 | -20.385 | 0.528 | 1.671 | 19.243 | -40.803 |
| | Image-side surface56 | -78.426 | 0.460 | | | |
| Sixth lens element 6 | Object-side surface65 | 4.019 | 0.555 | 1.567 | 37.533 | 10.767 |
| | Image-side surface66 | 11.068 | 1.230 | | | |
| Seventh lens element 7 | Object-side surface75 | -4.017 | 0.409 | 1.567 | 37.533 | -4.696 |
| | Image-side surface76 | 8.314 | 0.294 | | | |
| Filter 9 | Object-side surface95 | Infinity | 0.210 | 1.560 | 51.300 | |
| | Image-side surface96 | Infinity | 0.612 | | | |
| | Image plane 99 | Infinity | | | | |

FIG. 24

| Surface | K | $a_4$ | $a_6$ | $a_8$ | $a_{10}$ |
|---|---|---|---|---|---|
| 15 | 2.940414E-01 | 6.243029E-04 | 1.507316E-04 | -3.019519E-05 | -1.389357E-06 |
| 16 | 0.000000E+00 | -1.545309E-02 | 1.022506E-02 | -3.245910E-03 | 6.336494E-04 |
| 25 | 1.175861E+01 | -2.027711E-02 | 1.046213E-02 | -3.119071E-03 | 4.729367E-04 |
| 26 | 2.085075E+00 | -6.520030E-04 | 2.227478E-03 | 5.751269E-04 | -4.583611E-04 |
| 35 | 0.000000E+00 | -3.091672E-02 | 2.377043E-03 | -3.168244E-03 | 8.206250E-04 |
| 36 | 1.919131E+00 | -3.030846E-02 | 2.229959E-03 | -1.355366E-03 | 3.254927E-04 |
| 45 | 2.526554E+00 | -9.238455E-03 | -7.061159E-04 | 9.024782E-04 | 5.278027E-05 |
| 46 | -3.323647E+00 | -4.668658E-03 | -8.298545E-03 | 3.531136E-03 | -7.893593E-04 |
| 55 | -2.503319E+01 | 8.252236E-03 | -1.289696E-02 | 5.831394E-03 | -2.191242E-03 |
| 56 | 1.585951E+00 | -1.372919E-02 | -6.412206E-04 | 1.139547E-03 | -4.494415E-04 |
| 65 | -9.732140E+00 | -8.963341E-03 | -3.049287E-03 | 9.301699E-04 | -1.801221E-04 |
| 66 | 5.910234E+00 | 2.002232E-03 | -4.876752E-03 | 1.059810E-03 | -1.439611E-04 |
| 75 | -4.376351E-01 | -7.214969E-03 | -2.819540E-04 | 3.386722E-04 | -4.412623E-05 |
| 76 | 3.547940E-01 | -1.441392E-02 | 9.069497E-04 | -1.159814E-07 | -6.445258E-06 |
| Surface | $a_{12}$ | $a_{14}$ | $a_{16}$ | $a_{18}$ | $a_{20}$ |
| 15 | 1.032629E-05 | -3.844272E-07 | -1.311242E-06 | | |
| 16 | -1.312528E-04 | 2.191750E-05 | -1.064040E-06 | | |
| 25 | -5.599979E-05 | 2.223373E-06 | 2.453212E-06 | | |
| 26 | 2.476975E-04 | -7.958526E-05 | 1.514984E-05 | | |
| 35 | -2.498773E-04 | 4.199436E-05 | -2.817675E-06 | | |
| 36 | -7.742648E-05 | 1.375050E-05 | -7.977283E-07 | | |
| 45 | -7.740694E-05 | 1.380448E-05 | -7.414571E-07 | | |
| 46 | 1.610977E-04 | -2.543087E-05 | 1.786371E-06 | | |
| 55 | 6.875831E-04 | -1.505018E-04 | 2.035793E-05 | -1.522904E-06 | 4.762561E-08 |
| 56 | 1.188838E-04 | -1.883649E-05 | 1.682501E-06 | -7.858443E-08 | 1.498683E-09 |
| 65 | 2.400927E-05 | -2.255250E-06 | 1.493600E-07 | -6.202940E-09 | 1.180670E-10 |
| 66 | 1.314368E-05 | -7.905540E-07 | 2.942437E-08 | -6.216630E-10 | 6.104000E-12 |
| 75 | 2.985229E-06 | -1.218290E-07 | 3.032237E-09 | -4.259400E-11 | 2.620000E-13 |
| 76 | 5.926376E-07 | -2.873034E-08 | 8.440150E-10 | -1.389400E-11 | 9.700000E-14 |

FIG. 25

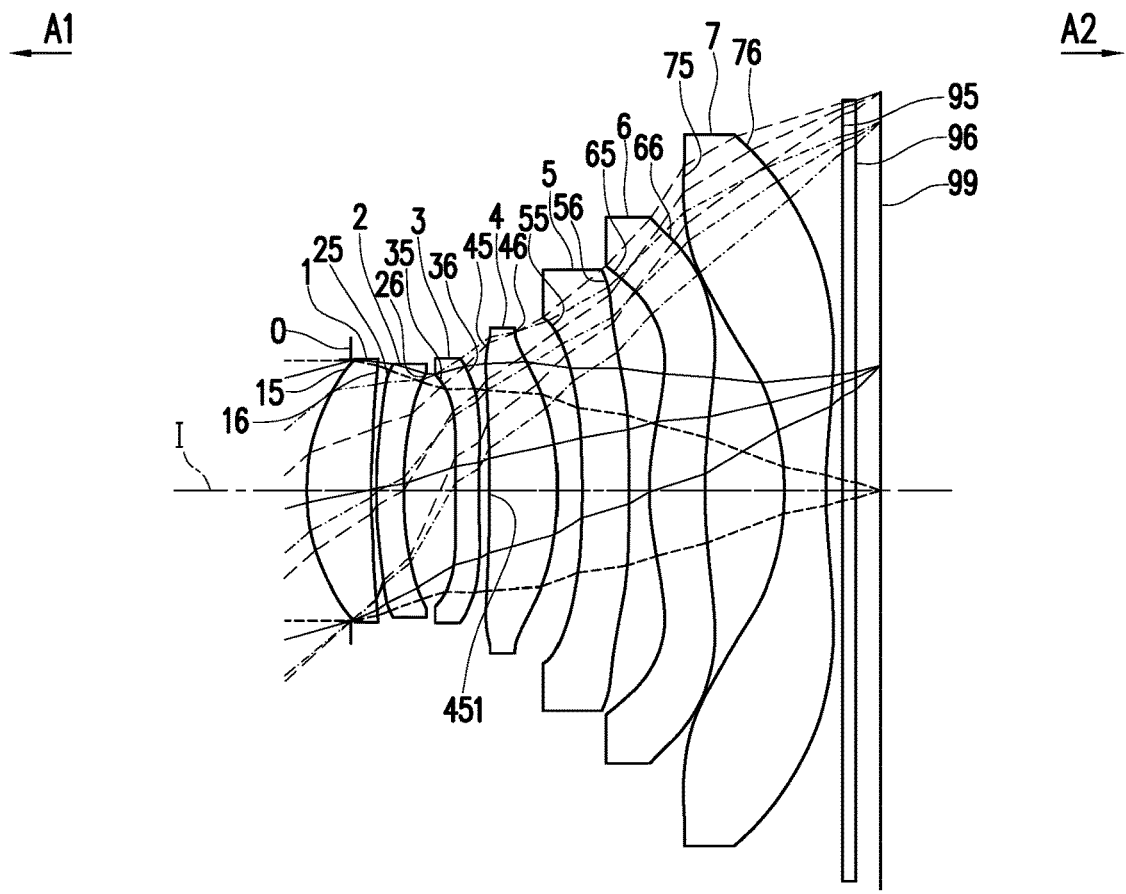
FIG. 26
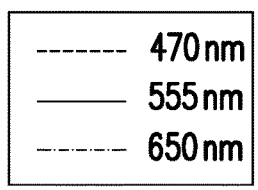
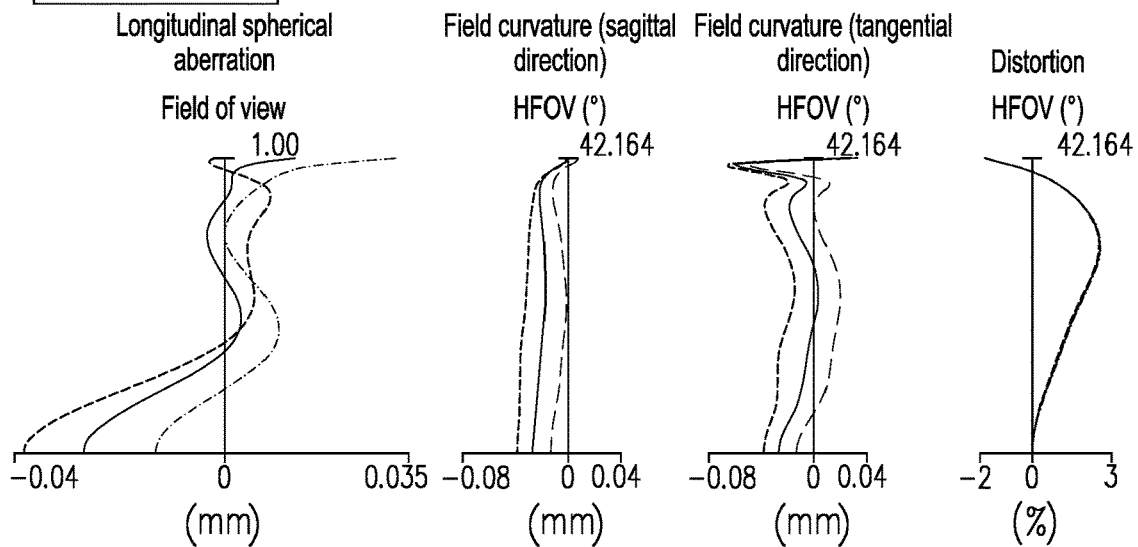
FIG. 27A  FIG. 27B  FIG. 27C  FIG. 27D

| Sixth embodiment |||||||
|---|---|---|---|---|---|---|
| EFL=6.677 mm, HFOV=42.164°, System length=8.620 mm, Fno=1.700, Image height=5.980 mm |||||||
| Device | Surface | Radius of curvature (mm) | Thickness (mm) | Refractive index | Abbe number | Focal length (mm) |
| Object | | Infinity | Infinity | | | |
| Aperture 0 | | Infinity | -0.667 | | | |
| First lens element 1 | Object-side surface15 | 3.088 | 0.973 | 1.545 | 55.987 | 7.353 |
| | Image-side surface16 | 11.877 | 0.076 | | | |
| Second lens element 2 | Object-side surface25 | 7.531 | 0.408 | 1.661 | 20.373 | -28.656 |
| | Image-side surface26 | 5.286 | 0.778 | | | |
| Third lens element 3 | Object-side surface35 | 24.147 | 0.353 | 1.671 | 19.243 | -41.606 |
| | Image-side surface36 | 12.929 | 0.157 | | | |
| Fourth lens element 4 | Object-side surface45 | -310.505 | 1.025 | 1.545 | 55.987 | 9.850 |
| | Image-side surface46 | -5.296 | 0.369 | | | |
| Fifth lens element 5 | Object-side surface55 | -11.639 | 0.700 | 1.671 | 19.243 | -17.575 |
| | Image-side surface56 | -527.926 | 0.309 | | | |
| Sixth lens element 6 | Object-side surface65 | 3.728 | 0.843 | 1.567 | 37.533 | 9.506 |
| | Image-side surface66 | 10.974 | 1.192 | | | |
| Seventh lens element 7 | Object-side surface75 | -4.398 | 0.629 | 1.567 | 37.533 | -4.822 |
| | Image-side surface76 | 7.701 | 0.223 | | | |
| Filter 9 | Object-side surface95 | Infinity | 0.210 | 1.560 | 51.300 | |
| | Image-side surface96 | Infinity | 0.375 | | | |
| | Image plane 99 | Infinity | | | | |

FIG. 28

| Surface | K | $a_4$ | $a_6$ | $a_8$ | $a_{10}$ |
|---|---|---|---|---|---|
| 15 | 2.940414E-01 | -4.352138E-04 | -1.785605E-04 | 2.039449E-05 | -7.916860E-06 |
| 16 | 0.000000E+00 | -1.616370E-02 | 9.138793E-03 | -3.175821E-03 | 7.392667E-04 |
| 25 | 1.175861E+01 | -2.261348E-02 | 1.053207E-02 | -3.263810E-03 | 5.655699E-04 |
| 26 | 2.085075E+00 | -5.711223E-03 | 2.848823E-03 | 2.770457E-04 | -6.031689E-04 |
| 35 | 0.000000E+00 | -3.072282E-02 | 2.779539E-03 | -3.065626E-03 | 8.382142E-04 |
| 36 | 1.919131E+00 | -2.940094E-02 | 2.030013E-03 | -1.171641E-03 | 3.029932E-04 |
| 45 | 2.526554E+00 | -8.361603E-03 | -9.795045E-04 | 1.043494E-03 | 2.794491E-05 |
| 46 | -3.323647E+00 | -3.990739E-03 | -8.413796E-03 | 3.527230E-03 | -7.838688E-04 |
| 55 | -2.503319E+01 | 9.221928E-03 | -1.320872E-02 | 5.965099E-03 | -2.185920E-03 |
| 56 | 1.585951E+00 | -1.235662E-02 | -7.795252E-04 | 1.198159E-03 | -4.774142E-04 |
| 65 | -9.732140E+00 | -3.055193E-03 | -3.438785E-03 | 9.220471E-04 | -1.791439E-04 |
| 66 | 5.910234E+00 | 6.327406E-03 | -5.117327E-03 | 1.085295E-03 | -1.483354E-04 |
| 75 | -4.376351E-01 | -6.873398E-03 | -3.121136E-04 | 3.386716E-04 | -4.416351E-05 |
| 76 | 3.547940E-01 | -1.277297E-02 | 8.265264E-04 | -5.027193E-07 | -6.225558E-06 |
| Surface | $a_{12}$ | $a_{14}$ | $a_{16}$ | $a_{18}$ | $a_{20}$ |
| 15 | 1.931553E-06 | -1.279933E-06 | -3.339039E-09 | | |
| 16 | -1.255578E-04 | 1.277424E-05 | -3.598906E-07 | | |
| 25 | -4.927765E-05 | 1.375735E-06 | 4.682900E-07 | | |
| 26 | 2.768729E-04 | -6.309973E-05 | 6.937597E-06 | | |
| 35 | -2.570486E-04 | 4.140976E-05 | -5.876103E-07 | | |
| 36 | -7.818396E-05 | 1.394389E-05 | -2.068419E-07 | | |
| 45 | -7.718962E-05 | 1.398001E-05 | -7.575187E-07 | | |
| 46 | 1.621275E-04 | -2.539872E-05 | 1.730031E-06 | | |
| 55 | 6.858840E-04 | -1.507306E-04 | 2.035563E-05 | -1.519851E-06 | 4.790087E-08 |
| 56 | 1.238769E-04 | -1.909359E-05 | 1.660468E-06 | -7.554581E-08 | 1.399851E-09 |
| 65 | 2.409855E-05 | -2.267622E-06 | 1.482865E-07 | -6.219083E-09 | 1.275530E-10 |
| 66 | 1.341289E-05 | -7.921739E-07 | 2.897679E-08 | -5.881260E-10 | 4.971000E-12 |
| 75 | 2.985125E-06 | -1.218071E-07 | 3.032643E-09 | -4.259400E-11 | 2.600000E-13 |
| 76 | 5.912279E-07 | -2.850420E-08 | 8.216700E-10 | -1.378200E-11 | 1.040000E-13 |

FIG. 29

| Condition expression | First embodiment | Second embodiment | Third embodiment | Fourth embodiment | Fifth embodiment | Sixth embodiment |
|---|---|---|---|---|---|---|
| V3+V4+V5+V6+V7 | 187.698 | 169.452 | 151.205 | 169.538 | 169.538 | 169.538 |
| V4+V5+V6+V7 | 168.456 | 150.209 | 131.962 | 150.295 | 150.295 | 150.295 |
| D22t71/D42t61 | 3.600 | 7.698 | 7.839 | 7.133 | 4.198 | 4.154 |
| (EFL+TL)/ImgH | 2.597 | 3.000 | 2.658 | 2.797 | 2.380 | 2.423 |
| ImgH/Fno | 3.399 | 3.000 | 2.008 | 3.115 | 3.000 | 3.518 |
| ALT/Gmax | 3.879 | 4.600 | 3.816 | 2.738 | 3.219 | 4.136 |
| (T6+G67)/T5 | 2.900 | 6.153 | 5.004 | 5.638 | 3.382 | 2.905 |
| TTL/(T2+G45) | 9.901 | 19.359 | 18.942 | 14.886 | 12.150 | 11.095 |
| Tmax/Tmin | 3.500 | 3.501 | 4.969 | 3.500 | 3.500 | 2.900 |
| (TTL+ImgH)/BFL | 30.040 | 20.108 | 29.822 | 14.811 | 13.006 | 18.072 |
| (TL+ImgH)/AAG | 4.524 | 4.526 | 4.719 | 3.899 | 3.902 | 4.787 |
| EFL/Gmax | 4.684 | 5.599 | 3.805 | 3.927 | 5.600 | 5.601 |
| (G45+T7)/T6 | 0.829 | 1.273 | 0.456 | 0.732 | 1.500 | 1.184 |
| ALT/(G12+G23+G67) | 2.500 | 2.500 | 2.297 | 1.665 | 1.618 | 2.409 |
| (T1+T3)/(G12+G34+G45) | 3.216 | 2.419 | 3.454 | 2.270 | 2.200 | 2.203 |
| (EFL+ImgH)/Tmax | 10.090 | 9.600 | 5.976 | 9.602 | 13.259 | 12.351 |
| ImgH/(AAG+BFL) | 1.581 | 1.366 | 1.556 | 1.201 | 1.319 | 1.621 |
| TTL/Gmax | 6.521 | 7.700 | 6.142 | 5.321 | 6.916 | 7.231 |
| (T5+G56+T7)/T1 | 1.434 | 1.641 | 1.049 | 1.008 | 1.850 | 1.683 |
| TL/(T4+G45) | 5.300 | 6.291 | 4.569 | 5.398 | 5.301 | 5.605 |

FIG. 30

OPTICAL IMAGING LENS

CROSS-REFERENCE TO RELATED APPLICATION

This application claims the priority benefit of Chinese application no. 202111490340.3, filed on Dec. 8, 2021. The entirety of the above-mentioned patent application is hereby incorporated by reference herein and made a part of this specification.

BACKGROUND

Technical Field

The disclosure relates to an optical element, and in particular to an optical imaging lens.

Description of Related Art

In recent years, optical imaging lenses has been continuously evolving, and the range of applications has become wider. In addition to requirements for light, thin, short, and small lenses, since the design of a small f-number (Fno) facilitates an increase in the luminous flux, a large field of view has gradually become a trend. Moreover, to successfully shoot images under a low light source, an image height of the optical imaging lens is required to be increased to receive imaging rays by using a relatively large image sensor to meet the requirements for high pixels. In the meanwhile, the market also has an increasingly strict quality standard for chromatic aberration and optical aberration of the optical imaging lens. Therefore, how to design an optical imaging lens that is light, thin, short, and small, has a small f-number, a large field of view, and a large image height, and has good imaging quality has become an issue to be challenged and solved.

SUMMARY

The disclosure provides an optical imaging lens that has a small f-number, a large field of view, and a larger image height, improves chromatic aberration and optical aberration, and has favorable imaging quality.

The disclosure provides an optical imaging lens, including a first lens element, a second lens element, a third lens element, a fourth lens element, a fifth lens element, a sixth lens element, and a seventh lens element sequentially arranged along an optical axis from an object side to an image side. Each of the first lens element to the seventh lens element includes an object-side surface facing the object side and allowing an imaging ray to pass through and an image-side surface facing the image side and allowing the imaging ray to pass through. The first lens element has positive refracting power. A periphery region of the object-side surface of the first lens element is convex. A periphery region of the object-side surface of the second lens element is convex. The fourth lens element has positive refracting power. A periphery region of the object-side surface of the fourth lens element is convex. An optical axis region of the image-side surface of the fifth lens element is convex. An optical axis region of the object-side surface of the sixth lens element is convex. An optical axis region of the image-side surface of the sixth lens element is concave. An optical axis region of the object-side surface of the seventh lens element is concave. Lens elements of the optical imaging lens are only the seven lens elements, and satisfy $V3+V4+V5+V6+V7 \leq 195.000$, where V3 is an Abbe number of the third lens element, V4 is an Abbe number of the fourth lens element, V5 is an Abbe number of the fifth lens element, V6 is an Abbe number of the sixth lens element, and V7 is an Abbe number of the seventh lens element.

The disclosure also provides an optical imaging lens, including a first lens element, a second lens element, a third lens element, a fourth lens element, a fifth lens element, a sixth lens element, and a seventh lens element sequentially arranged along an optical axis from an object side to an image side. Each of the first lens element to the seventh lens element includes an object-side surface facing the object side and allowing an imaging ray to pass through and an image-side surface facing the image side and allowing the imaging ray to pass through. The first lens element has positive refracting power. A periphery region of the object-side surface of the first lens element is convex. A periphery region of the object-side surface of the third lens element is concave. The fourth lens element has positive refracting power. A periphery region of the object-side surface of the fourth lens element is convex. An optical axis region of the object-side surface of the fifth lens element is concave. An optical axis region of the image-side surface of the sixth lens element is concave. An optical axis region of the object-side surface of the seventh lens element is concave. Lens elements of the optical imaging lens are only the seven lens elements, and satisfy $V4+V5+V6+V7 \leq 170.000$.

The disclosure also provides an optical imaging lens, including a first lens element, a second lens element, a third lens element, a fourth lens element, a fifth lens element, a sixth lens element, and a seventh lens element sequentially arranged along an optical axis from an object side to an image side. Each of the first lens element to the seventh lens element includes an object-side surface facing the object side and allowing an imaging ray to pass through and an image-side surface facing the image side and allowing the imaging ray to pass through. The first lens element has positive refracting power. The fourth lens element has positive refracting power. A periphery region of the object-side surface of the fourth lens element is convex. An optical axis region of the object-side surface of the sixth lens element is convex. An optical axis region of the image-side surface of the sixth lens element is concave. An optical axis region of the object-side surface of the seventh lens element is concave. Lens elements of the optical imaging lens are only the seven lens elements, and satisfy $V4+V5+V6+V7 \leq 170.000$ and $D22t71/D42t61 \geq 3.600$, where D22t71 is a distance from the image-side surface of the second lens element to the object-side surface of the seventh lens element on the optical axis, and D42t61 is a distance from the image-side surface of the fourth lens element to the object-side surface of the sixth lens element on the optical axis.

Based on the foregoing, in the optical imaging lens of the embodiments of the disclosure: by satisfying the above conditions of concave-convex curved surface arrangement design and refracting powers of the lens elements, the optical imaging lens has a smaller f-number, a larger field of view, a larger image height, improves chromatic aberration and optical aberration, and has favorable imaging quality.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 6 is a schematic diagram of an optical imaging lens of a first embodiment of the disclosure.

FIG. 7A to FIG. 7D are diagrams of a longitudinal spherical aberration and various optical aberrations of the optical imaging lens of the first embodiment.

FIG. 8 shows detailed optical data of the optical imaging lens of the first embodiment of the disclosure.

FIG. 9 shows aspheric parameters of the optical imaging lens of the first embodiment of the disclosure.

FIG. 10 is a schematic diagram of an optical imaging lens of a second embodiment of the disclosure.

FIG. 11A to FIG. 11D are diagrams of a longitudinal spherical aberration and various optical aberrations of the optical imaging lens of the second embodiment.

FIG. 12 shows detailed optical data of the optical imaging lens of the second embodiment of the disclosure.

FIG. 13 shows aspheric parameters of the optical imaging lens of the second embodiment of the disclosure.

FIG. 16 shows detailed optical data of the optical imaging lens of the third embodiment of the disclosure.

FIG. 17 shows aspheric parameters of the optical imaging lens of the third embodiment of the disclosure.

FIG. 18 is a schematic diagram of an optical imaging lens of a fourth embodiment of the disclosure.

FIG. 19A to FIG. 19D are diagrams of a longitudinal spherical aberration and various optical aberrations of the optical imaging lens of the fourth embodiment.

FIG. 20 shows detailed optical data of the optical imaging lens of the fourth embodiment of the disclosure.

FIG. 21 shows aspheric parameters of the optical imaging lens of the fourth embodiment of the disclosure.

FIG. 22 is a schematic diagram of an optical imaging lens of a fifth embodiment of the disclosure.

FIG. 23A to FIG. 23D are diagrams of a longitudinal spherical aberration and various optical aberrations of the optical imaging lens of the fifth embodiment.

FIG. 24 shows detailed optical data of the optical imaging lens of the fifth embodiment of the disclosure.

FIG. 25 shows aspheric parameters of the optical imaging lens of the fifth embodiment of the disclosure.

FIG. 26 is a schematic diagram of an optical imaging lens of a sixth embodiment of the disclosure.

FIG. 27A to FIG. 27D are diagrams of a longitudinal spherical aberration and various optical aberrations of the optical imaging lens of the sixth embodiment.

FIG. 28 shows detailed optical data of the optical imaging lens of the sixth embodiment of the disclosure.

FIG. 29 shows aspheric parameters of the optical imaging lens of the sixth embodiment of the disclosure.

FIG. 30 shows values of relational expressions of important parameters of the optical imaging lenses of the first to sixth embodiments of the disclosure.

DESCRIPTION OF THE EMBODIMENTS

The terms "optical axis region", "periphery region", "concave", and "convex" used in this specification and claims should be interpreted based on the definition listed in the specification by the principle of lexicographer.

Figure 1:
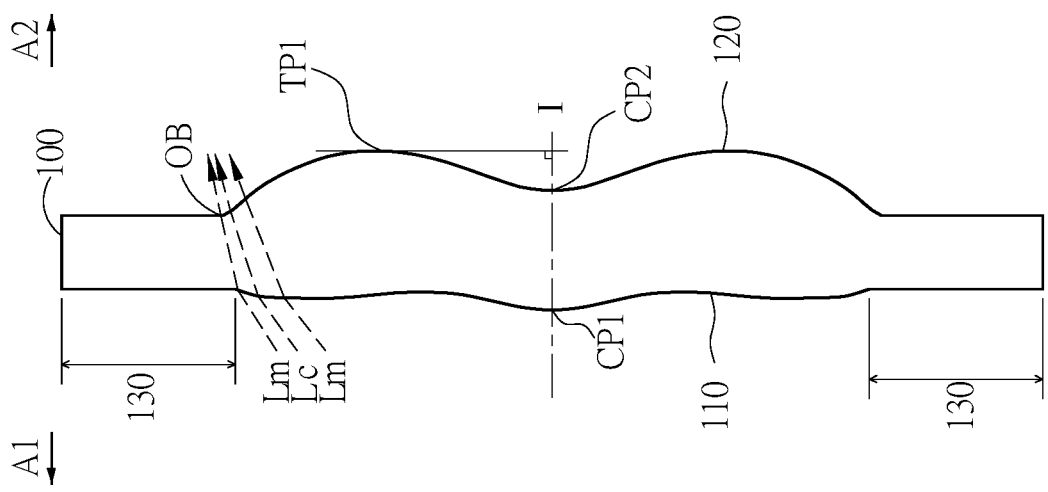
FIG. 1 is a schematic diagram showing a surface shape structure of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figures 3, 4, 5:
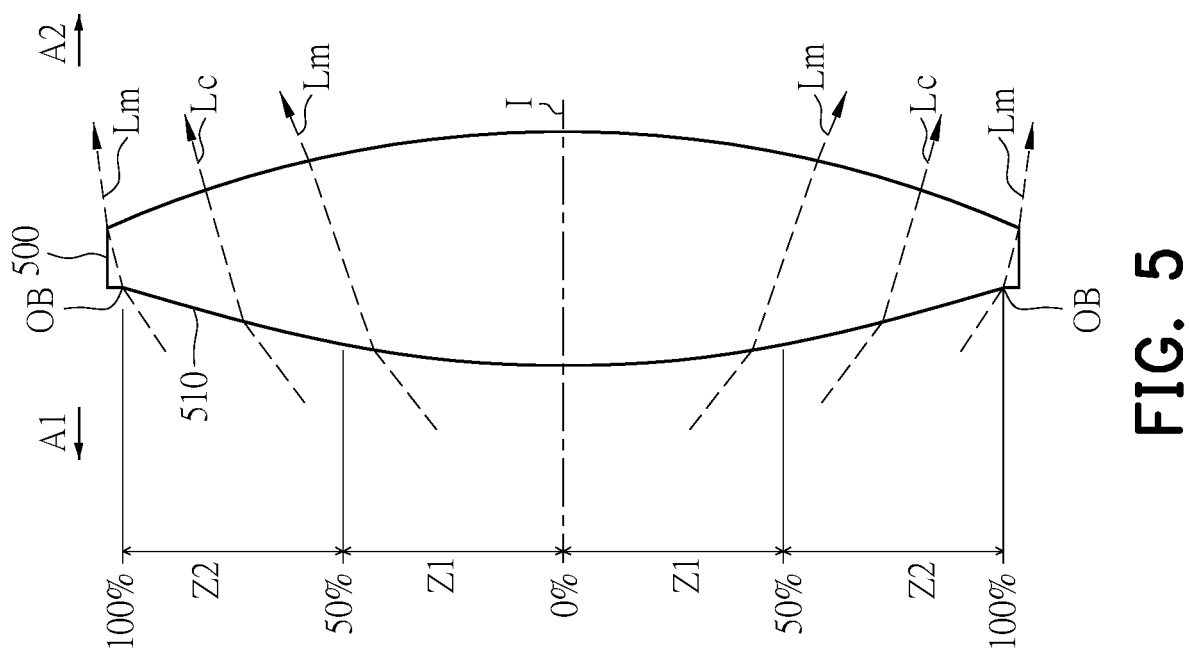
FIG. 3 is a schematic diagram showing a surface shape structure of a lens element of Example 1.
FIG. 4 is a schematic diagram showing a surface shape structure of a lens element of Example 2.
FIG. 5 is a schematic diagram showing a surface shape structure of a lens element of Example 3.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. A surface of the lens element 100 may have no transition point or have at least one transition point. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

When a surface of the lens element has at least one transition point, the region of the surface of the lens element from the central point to the first transition point TP1 is defined as the optical axis region, which includes the central point. The region located radially outside of the farthest transition point (the Nth transition point) from the optical axis I to the optical boundary OB of the surface of the lens element is defined as the periphery region. In some embodiments, there may be intermediate regions present between the optical axis region and the periphery region, with the number of intermediate regions depending on the number of the transition points. When a surface of the lens element has no transition point, the optical axis region is defined as a region of 0%-50% of the distance between the optical axis I and the optical boundary OB of the surface of the lens element, and the periphery region is defined as a region of 50%-100% of the distance between the optical axis I and the optical boundary OB of the surface of the lens element.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
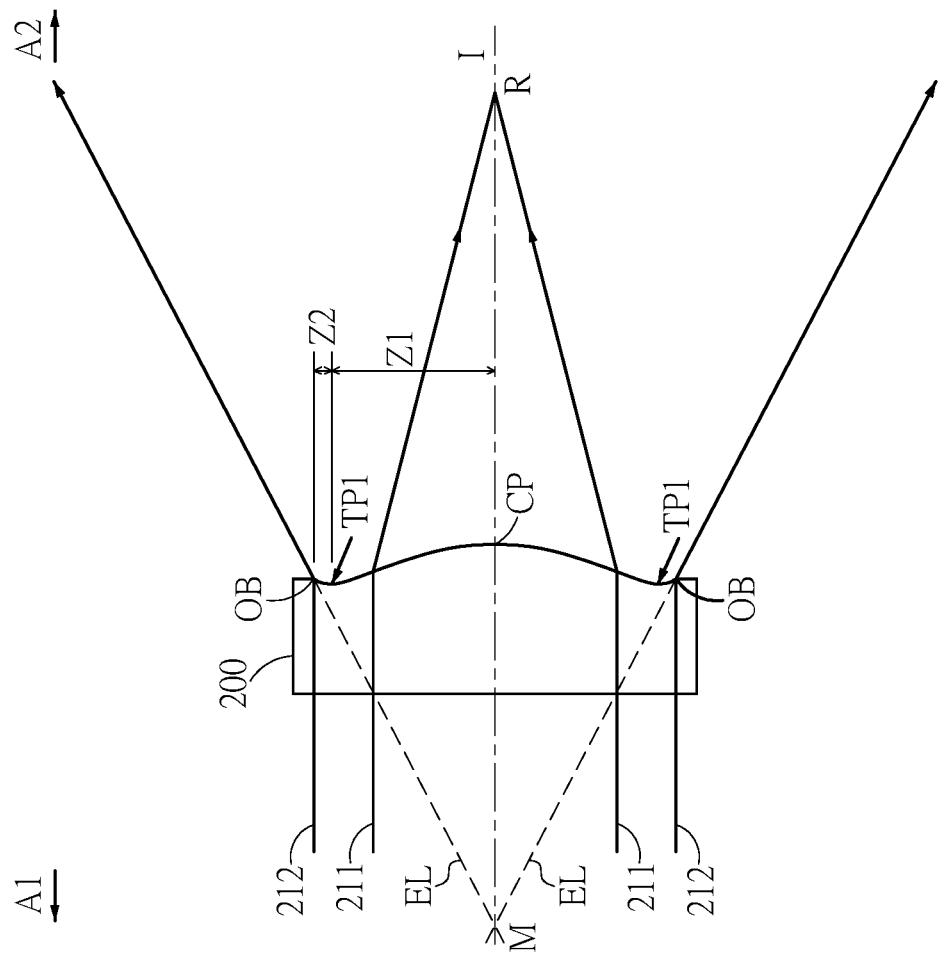
FIG. 2 is a schematic diagram showing a concave-convex structure and a point of intersection of rays of a lens element.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius of curvature" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex- (concave-) region," can be used alternatively.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region of 0%-50% of the distance between the optical axis I and the optical boundary OB of the surface of the lens element and the periphery region is defined as the region of 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

FIG. 6 is a schematic diagram of an optical imaging lens of a first embodiment of the disclosure. FIG. 7A to FIG. 7D are diagrams of a longitudinal spherical aberration and various optical aberrations of the optical imaging lens of the first embodiment. First, referring to FIG. 6, an optical imaging lens 10 of the first embodiment of the disclosure includes an aperture 0, a first lens element 1, a second lens element 2, a third lens element 3, a fourth lens element 4, a fifth lens element 5, a sixth lens element 6, a seventh lens element 7, and a filter 9 sequentially arranged along the optical axis I of the optical imaging lens 10 from the object side A1 to the image side A2. When rays emitted by an object to be photographed enter the optical imaging lens 10, the rays may form an image on an image plane 99 after passing through the aperture 0, the first lens element 1, the second lens element 2, the third lens element 3, the fourth lens element 4, the fifth lens element 5, the sixth lens element 6, the seventh lens element 7, and the filter 9. The filter 9 is arranged between an image-side surface 76 of the seventh lens element 7 and the image plane 99. In addition, the object side A1 is a side facing the object to be photographed, and the image side A2 is a side facing the image plane 99. In this embodiment, the filter 9 is an IR cut filter.

In this embodiment, the first lens element 1, the second lens element 2, the third lens element 3, the fourth lens element 4, the fifth lens element 5, the sixth lens element 6, the seventh lens element 7, and the filter 9 of the optical imaging lens 10 respectively have object-side surfaces 15, 25, 35, 45, 55, 65, 75, 95 facing the object side A1 and allowing imaging rays to pass through and image-side surfaces 16, 26, 36, 46, 56, 66, 76, 96 facing the image side A2 and allowing the imaging rays to pass through. In this embodiment, the first lens element 1 is arranged between the aperture 0 and the second lens element 2.

The first lens element 1 has positive refracting power. An optical axis region 151 of the object-side surface 15 of the first lens element 1 is convex, and a periphery region 153 thereof is convex. An optical axis region 161 of the image-side surface 16 of the first lens element 1 is concave, and a periphery region 163 thereof is concave. In this embodiment, both the object-side surface 15 and the image-side surface 16 of the first lens element 1 are aspheric surfaces, but the disclosure is not limited thereto.

The second lens element 2 has negative refracting power. An optical axis region 251 of the object-side surface 25 of the second lens element 2 is convex, and a periphery region 253 thereof is convex. An optical axis region 261 of the image-side surface 26 of the second lens element 2 is concave, and a periphery region 263 thereof is concave. In this embodiment, both the object-side surface 25 and the image-side surface 26 of the second lens element 2 are aspheric surfaces, but the disclosure is not limited thereto.

The third lens element 3 has negative refracting power. An optical axis region 351 of the object-side surface 35 of the third lens element 3 is convex, and a periphery region 353 thereof is concave. An optical axis region 361 of the image-side surface 36 of the third lens element 3 is concave, and a periphery region 363 thereof is convex. In this embodiment, both the object-side surface 35 and the image-side surface 36 of the third lens element 3 are aspheric surfaces, but the disclosure is not limited thereto.

The fourth lens element 4 has positive refracting power. An optical axis region 451 of the object-side surface 45 of the fourth lens element 4 is convex, and a periphery region 453 thereof is convex. An optical axis region 461 of the image-side surface 46 of the fourth lens element 4 is convex, and a periphery region 463 thereof is convex. In this embodiment, both the object-side surface 45 and the image-side surface 46 of the fourth lens element 4 are aspheric surfaces, but the disclosure is not limited thereto.

The fifth lens element 5 has negative refracting power. An optical axis region 551 of the object-side surface 55 of the fifth lens element 5 is concave, and a periphery region 553 thereof is concave. An optical axis region 561 of the image-side surface 56 of the fifth lens element 5 is convex, and a periphery region 563 thereof is convex. In this embodiment, both the object-side surface 55 and the image-side surface 56 of the fifth lens element 5 are aspheric surfaces, but the disclosure is not limited thereto.

The sixth lens element 6 has positive refracting power. An optical axis region 651 of the object-side surface 65 of the sixth lens element 6 is convex, and a periphery region 653 thereof is concave. An optical axis region 661 of the image-side surface 66 of the sixth lens element 6 is concave, and a periphery region 663 thereof is convex. In this embodiment, both the object-side surface 65 and the image-side surface 66 of the sixth lens element 6 are aspheric surfaces, but the disclosure is not limited thereto.

The seventh lens element 7 has negative refracting power. An optical axis region 751 of the object-side surface 75 of the seventh lens element 7 is concave, and a periphery region 753 thereof is convex. An optical axis region 761 of the image-side surface 76 of the seventh lens element 7 is concave, and a periphery region 763 thereof is convex. In this embodiment, both the object-side surface 75 and the image-side surface 76 of the seventh lens element 7 are aspheric surfaces, but the disclosure is not limited thereto.

In this embodiment, lens elements of the optical imaging lens 10 are only the seven lens elements described above.

Other detailed optical data of the first embodiment is as shown in FIG. 8, and the optical imaging lens 10 of the first embodiment has an effective focal length (EFL) of 5.718 millimeters (mm), a half field of view (HFOV) of 42.162 degrees, a system length of 7.961 mm, an f-number (Fno) of 1.500, and an image height of 5.099 mm. The system length refers to a distance from the object-side surface 15 of the first lens element 1 to the image plane 99 on the optical axis I.

In addition, in this embodiment, a total of 14 surfaces, i.e., the object-side surfaces 15, 25, 35, 45, 55, 65, 75 and the image-side surfaces 16, 26, 36, 46, 56, 66, 76 of the first lens element 1, the second lens element 2, the third lens element 3, the fourth lens element 4, the fifth lens element 5, the sixth lens element 6, and the seventh lens element 7 are all aspheric surfaces. The object-side surfaces 15, 25, 35, 45, 55, 65, 75 and the image-side surfaces 16, 26, 36, 46, 56, 66, 76 are general even aspheric surfaces. These aspheric surfaces are defined according to Formula (1) below:

$$Z(Y) = \frac{Y^2}{R} \bigg/ \left(1 + \sqrt{1-(1+K)\frac{Y^2}{R^2}}\right) + \sum_{i=1}^{m} a_i \times Y^i \quad (1)$$

where
R: a radius of curvature at a position near the optical axis I on the surface of the lens element;
Z: a depth of an aspheric surface (a perpendicular distance between a point on the aspheric surface that is spaced by the distance Y from the optical axis and a tangent plane tangent to a vertex of the aspheric surface on the optical axis I);
Y: a perpendicular distance between a point on an aspheric curve and the optical axis I;
K: a conic constant; and
$a_i$: a $i^{th}$-order aspheric coefficient.

The aspheric coefficients of the object-side surface 15 of the first lens element 1 to the image-side surface 76 of the seventh lens element 7 in Formula (1) are as shown in FIG. 9. Field number 15 in FIG. 9 denotes an aspheric coefficient of the object-side surface 15 of the first lens element 1, and the other fields may be deduced by analogy. In this embodiment and the following embodiments, the second-order aspheric coefficient $a_2$ of each aspheric surface is zero.

In addition, the relationships between important parameters in the optical imaging lens 10 of the first embodiment are as shown in FIG. 30,
where
T1 is a thickness of the first lens element 1 on the optical axis I;
T2 is a thickness of the second lens element 2 on the optical axis I;
T3 is a thickness of the third lens element 3 on the optical axis I;
T4 is a thickness of the fourth lens element 4 on the optical axis I;
T5 is a thickness of the fifth lens element 5 on the optical axis I;
T6 is a thickness of the sixth lens element 6 on the optical axis I;
T7 is a thickness of the seventh lens element 7 on the optical axis I;
G12 is a distance from the image-side surface 16 of the first lens element 1 to the object-side surface 25 of the second lens element 2 on the optical axis I, i.e., an air gap between the first lens element 1 and the second lens element 2 on the optical axis I;
G23 is a distance from the image-side surface 26 of the second lens element 2 to the object-side surface 35 of the third lens element 3 on the optical axis I, i.e., an air gap between the second lens element 2 and the third lens element 3 on the optical axis I;
G34 is a distance from the image-side surface 36 of the third lens element 3 to the object-side surface 45 of the fourth lens element 4 on the optical axis I, i.e., an air gap between the third lens element 3 and the fourth lens element 4 on the optical axis I;
G45 is a distance from the image-side surface 46 of the fourth lens element 4 to the object-side surface 55 of the fifth lens element 5 on the optical axis I, i.e., an air gap between the fourth lens element 4 and the fifth lens element 5 on the optical axis I;
G56 is a distance from the image-side surface 56 of the fifth lens element 5 to the object-side surface 65 of the sixth lens element 6 on the optical axis I, i.e., an air gap between the fifth lens element 5 and the sixth lens element 6 on the optical axis I;
G67 is a distance from the image-side surface 66 of the sixth lens element 6 to the object-side surface 75 of the seventh lens element 7 on the optical axis I, i.e., an air gap between the sixth lens element 6 and the seventh lens element 7 on the optical axis I;
AAG is a sum of the six air gaps between the first lens element 1 to the seventh lens element 7 on the optical axis I, i.e., a sum of the air gaps G12, G23, G34, G45, G56, and G67;
ALT is a sum of thicknesses of the seven lens elements from the first lens element 1 to the seventh lens element 7 on the optical axis I, i.e., a sum of the thicknesses T1, T2, T3, T4, T5, T6, and T7;
TL is a distance from the object-side surface 15 of the first lens element 1 to the image-side surface 76 of the seventh lens element 7 on the optical axis I;
TTL is a distance from the object-side surface 15 of the first lens element 1 to the image plane 99 on the optical axis I;
BFL is a distance from the image-side surface 76 of the seventh lens element 7 to the image plane 99 on the optical axis I;
EFL is an effective focal length of the optical imaging lens 10;
HFOV is a half field of view of the optical imaging lens 10;
ImgH is an image height of the optical imaging lens 10; and
Fno is an f-number of the optical imaging lens 10.
In addition, the following are further defined:
G7F is a distance from the image-side surface 76 of the seventh lens element 7 to the object-side surface 95 of the filter 9 on the optical axis I, i.e., an air gap between the seventh lens element 7 and the filter 9 on the optical axis I;
TF is a thickness of the filter 9 on the optical axis I;
GFP is a distance from the image-side surface 95 of the filter 9 to the image plane 99 on the optical axis I, i.e., an air gap between the filter 9 and the image plane 99 on the optical axis I;
Tmax is a maximum value of the thicknesses of the seven lens elements from the first lens element 1 to the seventh lens element 7 on the optical axis I, i.e., a maximum value among T1, T2, T3, T4, T5, T6, and T7;
Tmin is a minimum value of the thicknesses of the seven lens elements from the first lens element 1 to the seventh lens element 7 on the optical axis I, i.e., a minimum value among T1, T2, T3, T4, T5, T6, and T7;
Gmax is a maximum value of the six air gaps between the first lens element 1 to the seventh lens element 7 on the optical axis I, i.e., a maximum value among G12, G23, G34, G45, G56, and G67;
D22t71 is a distance from the image-side surface 26 of the second lens element 2 to the object-side surface 75 of the seventh lens element 7 on the optical axis, i.e., a sum of G23, T3, G34, T4, G45, 15, G56, T6, G67;
D42t61 is the distance of the image-side surface 46 of the fourth lens element 4 to the object-side surface 65 of the sixth lens element 6 on the optical axis, i.e., the sum of G45, 15, and G56;
f1 is a focal length of the first lens element 1;
f2 is a focal length of the second lens element 2;
f3 is a focal length of the third lens element 3;
f4 is a focal length of the fourth lens element 4;
f5 is a focal length of the fifth lens element 5;

f6 is a focal length of the sixth lens element 6;
f7 is a focal length of the seventh lens element 7;
n1 is a refractive index of the first lens element 1;
n2 is a refractive index of the second lens element 2;
n3 is a refractive index of the third lens element 3;
n4 is a refractive index of the fourth lens element 4;
n5 is a refractive index of the fifth lens element 5;
n6 is a refractive index of the sixth lens element 6;
n7 is a refractive index of the seventh lens element 7;
V1 is an Abbe number of the first lens element 1, and the Abbe number may also be referred to as a dispersion coefficient;
V2 is an Abbe number of the second lens element 2;
V3 is an Abbe number of the third lens element 3;
V4 is an Abbe number of the fourth lens element 4;
V5 is an Abbe number of the fifth lens element 5;
V6 is an Abbe number of the sixth lens element 6; and
V7 is an Abbe number of the seventh lens element 7.

Then, referring to FIG. 7A to FIG. 7D in conjunction, FIG. 7A is a diagram showing a longitudinal spherical aberration on the image plane 99 at wavelengths of 470 nm, 555 nm, and 650 nm in the first embodiment, FIG. 7B and FIG. 7C respectively show a field curvature aberration in a sagittal direction and a field curvature aberration in a tangential direction on the image plane 99 at wavelengths of 470 nm, 555 nm, and 650 nm in the first embodiment, and FIG. 7D shows a distortion aberration on the image plane 99 at wavelengths of 470 nm, 555 nm, and 650 nm in the first embodiment. The longitudinal spherical aberration of the first embodiment is as shown in FIG. 7A. Curves formed by the wavelengths are very close to each other and are close to the middle, which indicates that off-axis rays at different heights at each wavelength are concentrated near an imaging point. It can be seen from the deflection amplitude of the curve at each wavelength that deviations of imaging points of the off-axis rays at different heights are controlled within a range of ±0.03 mm. Therefore, in the first embodiment, the spherical aberration of the same wavelength is obviously improved. In addition, distances between the three representative wavelengths are also quite close to each other, which indicates that imaging positions of rays at different wavelengths are quite concentrated, so the chromatic aberration is also obviously improved.

In the two field curvature aberration diagrams of FIG. 7B and FIG. 7C, focal length variations of the three representative wavelengths within the entire field of view range fall within ±0.04 mm, which indicates that the optical system of the first embodiment can effectively alleviate the optical aberrations. The distortion aberration diagram of FIG. 7D shows that the distortion aberration of this embodiment is maintained within a range of ±3%, which indicates that the distortion aberration of the first embodiment meets the imaging quality requirements of the optical system. It is accordingly indicated that, compared with an existing optical lens, the first embodiment can still provide good imaging quality in a case where the system length is reduced to 7.961 mm. Therefore, the first embodiment can have a smaller f-number, a larger field of view, a larger image height, and favorable imaging quality in a case where good optical performance is maintained.

FIG. 10 is a schematic diagram of an optical imaging lens of a second embodiment of the disclosure. FIG. 11A to FIG. 11D are diagrams of a longitudinal spherical aberration and various optical aberrations of the optical imaging lens of the second embodiment. First, referring to FIG. 10, the second embodiment of the optical imaging lens 10 of the disclosure is approximately similar to the first embodiment, and their differences are as follows: the optical data, aspheric coefficients, and parameters among the lens elements 1, 2, 3, 4, 5, 6, and 7 are more or less different. It should be noted here that, in order to clearly show the figure, reference numerals of the optical axis regions and the periphery regions with surface shapes similar to those of the first embodiment are partially omitted in FIG. 10.

Detailed optical data of the optical imaging lens 10 of the second embodiment is as shown in FIG. 12, and the optical imaging lens 10 of the second embodiment has an effective focal length of 5.949 mm, a half field of view of 41.334 degrees, a system length of 8.181 mm, an f-number of 1.500, and an image height of 4.500 mm.

As shown in FIG. 13, FIG. 13 shows the aspheric coefficients of the object-side surface 15 of the first lens element 1 to the image-side surface 76 of the seventh lens element 7 of the second embodiment in Formula (1) above.

In addition, the relationships between important parameters in the optical imaging lens 10 of the second embodiment are as shown in FIG. 30.

The longitudinal spherical aberration of the second embodiment is as shown in FIG. 11A, and deviations of imaging points of off-axis rays at different heights are controlled within a range of ±0.02 mm. In the two field curvature aberration diagrams of FIG. 11B and FIG. 11C, focal length variations of the three representative wavelengths within the entire field of view range fall within ±0.04 mm. The distortion aberration diagram of FIG. 11D shows that the distortion aberration of this embodiment is maintained within a range of ±16%.

From the above description, it can be known that the longitudinal spherical aberration of the second embodiment is less than the longitudinal spherical aberration of the first embodiment.

Figure 14:
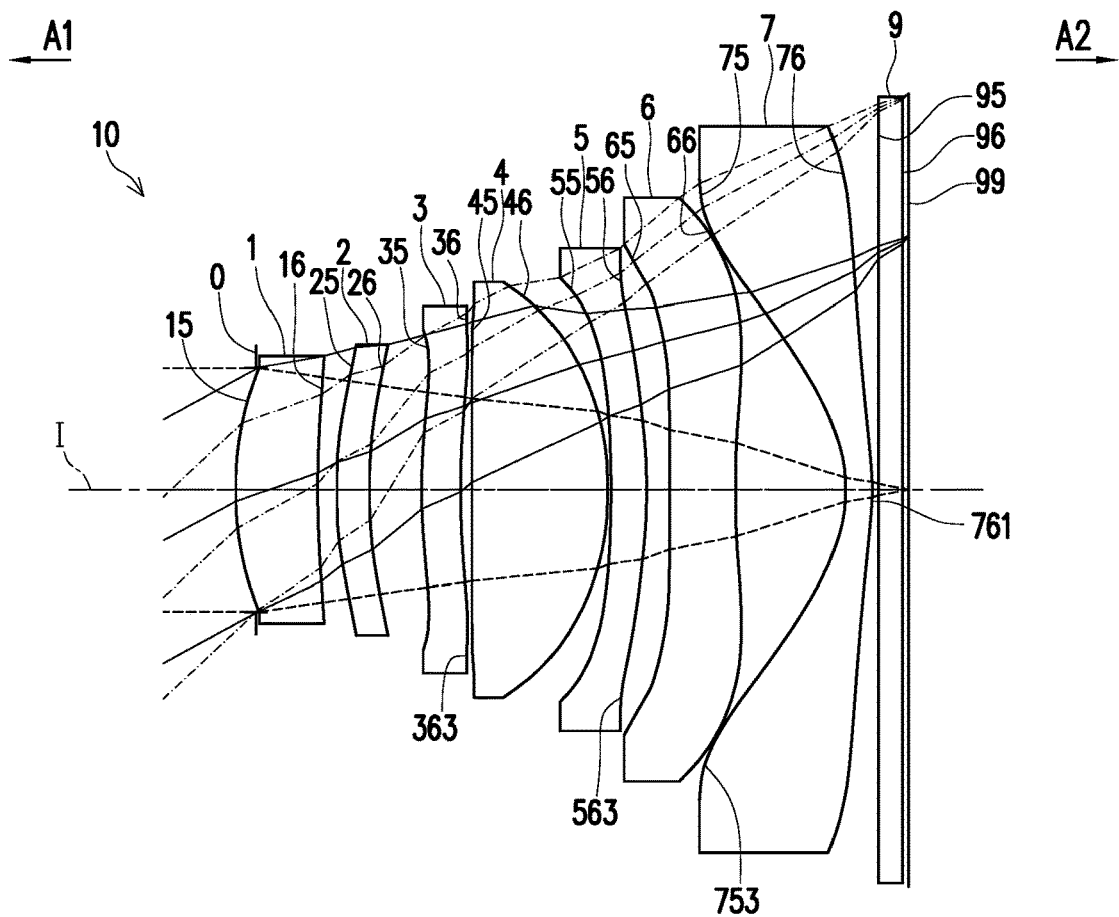
FIG. 14 is a schematic diagram of an optical imaging lens of a third embodiment of the disclosure.

FIG. 14 is a schematic diagram of an optical imaging lens of a third embodiment of the disclosure. FIG. 15A to FIG. 15D are diagrams of a longitudinal spherical aberration and various optical aberrations of the optical imaging lens of the third embodiment. First, referring to FIG. 14, the third embodiment of the optical imaging lens 10 of the disclosure is approximately similar to the first embodiment, and their differences are as follows: the optical data, aspheric coefficients, and parameters among the lens elements 1, 2, 3, 4, 5, 6, and 7 are more or less different. In addition, in this embodiment, the second lens element 2 has positive refracting power. The third lens element 3 has positive refracting power. The periphery region 363 of the image-side surface 36 of the third lens element 3 is concave. The fifth lens element 5 has positive refracting power. The periphery region 563 of the image-side surface 56 of the fifth lens element 5 is concave. The sixth lens element 6 has negative refracting power. The seventh lens element 7 has positive refracting power. The periphery region 753 of the object-side surface 75 of the seventh lens element 7 is concave. The optical axis region 761 of the image-side surface 76 of the seventh lens element 7 is convex. It should be noted here that, in order to clearly show the figure, reference numerals of the optical axis regions and the periphery regions with surface shapes similar to those of the first embodiment are partially omitted in FIG. 14.

Detailed optical data of the optical imaging lens 10 of the third embodiment is as shown in FIG. 16, and the optical imaging lens 10 of the third embodiment has an effective focal length of 3.590 mm, a half field of view of 42.800 degrees, a system length of 5.795 mm, an f-number of 1.700, and an image height of 3.414 mm.

As shown in FIG. 17, FIG. 17 shows the aspheric coefficients of the object-side surface 15 of the first lens element 1 to the image-side surface 76 of the seventh lens element 7 of the third embodiment in Formula (1) above.

In addition, the relationships between important parameters in the optical imaging lens 10 of the third embodiment are as shown in FIG. 30.

Figures 15A, 15B, 15C, 15D:
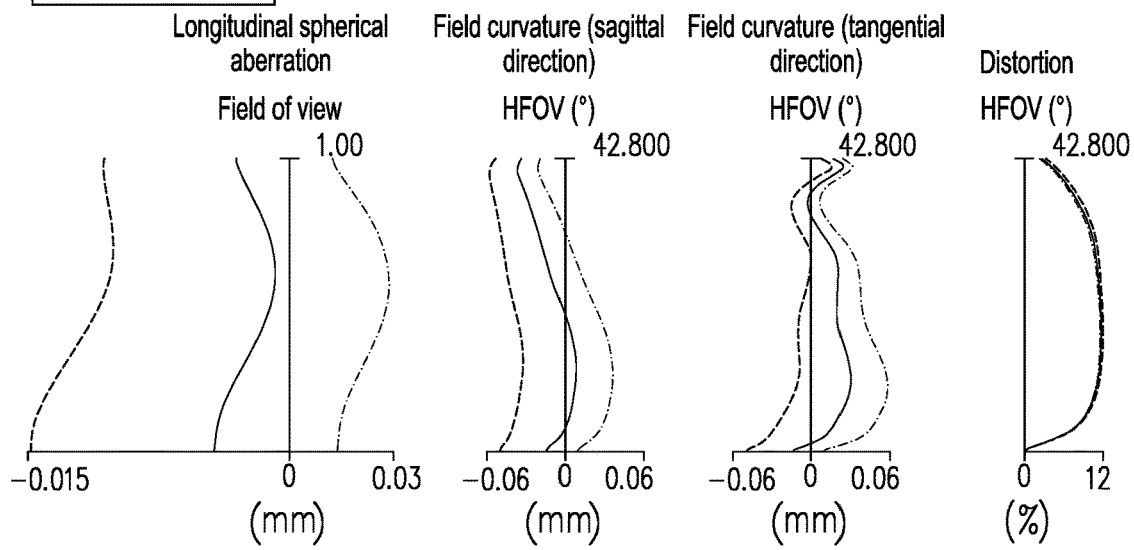
FIG. 15A to FIG. 15D are diagrams of a longitudinal spherical aberration and various optical aberrations of the optical imaging lens of the third embodiment.

The longitudinal spherical aberration of the third embodiment is as shown in FIG. 15A, and deviations of imaging points of off-axis rays at different heights are controlled within a range of ±0.05 mm. In the two field curvature aberration diagrams of FIG. 15B and FIG. 15C, focal length variations of the three representative wavelengths within the entire field of view range fall within ±0.06 mm. The distortion aberration diagram of FIG. 15D shows that the distortion aberration of this embodiment is maintained within a range of ±14%.

From the above description, it can be known that the system length of the third embodiment is smaller than the system length of the first embodiment, and the half field of view of the third embodiment is larger than the half field of view of the first embodiment. Therefore, compared with the first embodiment, the third embodiment has a larger angle range for receiving images. Moreover, compared with the first embodiment, the third embodiment is easier to manufacture and thus has a higher yield.

FIG. 18 is a schematic diagram of an optical imaging lens of a fourth embodiment of the disclosure. FIG. 19A to FIG. 19D are diagrams of a longitudinal spherical aberration and various optical aberrations of the optical imaging lens of the fourth embodiment. First, referring to FIG. 18, the fourth embodiment of the optical imaging lens 10 of the disclosure is approximately similar to the first embodiment, and their differences are as follows: the optical data, aspheric coefficients, and parameters among the lens elements 1, 2, 3, 4, 5, 6, and 7 are more or less different. It should be noted here that, in order to clearly show the figure, reference numerals of the optical axis regions and the periphery regions with surface shapes similar to those of the first embodiment are partially omitted in FIG. 18.

Detailed optical data of the optical imaging lens 10 of the fourth embodiment is as shown in FIG. 20, and the optical imaging lens 10 of the fourth embodiment has an effective focal length of 5.912 mm, a half field of view of 40.335 degrees, a system length of 8.011 mm, an f-number of 1.500, and an image height of 4.672 mm.

As shown in FIG. 21, FIG. 21 shows the aspheric coefficients of the object-side surface 15 of the first lens element 1 to the image-side surface 76 of the seventh lens element 7 of the fourth embodiment in Formula (1) above.

In addition, the relationships between important parameters in the optical imaging lens 10 of the fourth embodiment are as shown in FIG. 30.

The longitudinal spherical aberration of the fourth embodiment is as shown in FIG. 19A, and deviations of imaging points of off-axis rays at different heights are controlled within a range of ±0.045 mm. In the two field curvature aberration diagrams of FIG. 19B and FIG. 19C, focal length variations of the three representative wavelengths within the entire field of view range fall within ±0.05 mm. The distortion aberration diagram of FIG. 19D shows that the distortion aberration of this embodiment is maintained within a range of ±10%.

From the above description, it can be known that the fourth embodiment is easy to manufacture and thus has a higher yield.

FIG. 22 is a schematic diagram of an optical imaging lens of a fifth embodiment of the disclosure. FIG. 23A to FIG. 23D are diagrams of a longitudinal spherical aberration and various optical aberrations of the optical imaging lens of the fifth embodiment. First, referring to FIG. 22, the fifth embodiment of the optical imaging lens 10 of the disclosure is approximately similar to the first embodiment, and their differences are as follows: the optical data, aspheric coefficients, and parameters among the lens elements 1, 2, 3, 4, 5, 6, and 7 are more or less different. In addition, in this embodiment, the optical axis region 451 of the object-side surface 45 of the fourth lens element 4 is concave, and the periphery region 463 of the image-side surface 46 of the fourth lens element 4 is concave. It should be noted here that, in order to clearly show the figure, reference numerals of the optical axis regions and the periphery regions with surface shapes similar to those of the first embodiment are partially omitted in FIG. 22.

Detailed optical data of the optical imaging lens 10 of the fifth embodiment is as shown in FIG. 24, and the optical imaging lens 10 of the fifth embodiment has an effective focal length of 6.888 mm, a half field of view of 42.164 degrees, a system length of 8.508 mm, an f-number of 2.000, and an image height of 6.000 mm.

As shown in FIG. 25, FIG. 25 shows the aspheric coefficients of the object-side surface 15 of the first lens element 1 to the image-side surface 76 of the seventh lens element 7 of the fifth embodiment in Formula (1) above.

In addition, the relationships between important parameters in the optical imaging lens 10 of the fifth embodiment are as shown in FIG. 30.

The longitudinal spherical aberration of the fifth embodiment is as shown in FIG. 23A, and deviations of imaging points of off-axis rays at different heights are controlled within a range of ±0.04 mm. In the two field curvature aberration diagrams of FIG. 23B and FIG. 23C, focal length variations of the three representative wavelengths within the entire field of view range fall within ±0.05 mm. The distortion aberration diagram of FIG. 23D shows that the distortion aberration of this embodiment is maintained within a range of ±5%.

From the above description, it can be known that the half field of view of the fifth embodiment is larger than the half field of view of the first embodiment. Therefore, compared with the first embodiment, the fifth embodiment has a larger angle range for receiving images. Moreover, the image height of the fifth embodiment is greater than the image height of the first embodiment. Therefore, compared with the first embodiment, the fifth embodiment has better sensitivity.

FIG. 26 is a schematic diagram of an optical imaging lens of a sixth embodiment of the disclosure. FIG. 27A to FIG. 27D are diagrams of a longitudinal spherical aberration and various optical aberrations of the optical imaging lens of the sixth embodiment. First, referring to FIG. 26, the sixth embodiment of the optical imaging lens 10 of the disclosure is approximately similar to the first embodiment, and their differences are as follows: the optical data, aspheric coefficients, and parameters among the lens elements 1, 2, 3, 4, 5, 6, and 7 are more or less different. In addition, in this embodiment, the optical axis region 451 of the object-side surface 45 of the fourth lens element 4 is concave. It should be noted here that, in order to clearly show the figure, reference numerals of the optical axis regions and the periphery regions with surface shapes similar to those of the first embodiment are partially omitted in FIG. 26.

Detailed optical data of the optical imaging lens 10 of the sixth embodiment is as shown in FIG. 28, and the optical imaging lens 10 of the sixth embodiment has an effective focal length of 6.677 mm, a half field of view of 42.164 degrees, a system length of 8.620 mm, an f-number of 1.700, and an image height of 5.980 mm.

As shown in FIG. 29, FIG. 29 shows the aspheric coefficients of the object-side surface 15 of the first lens element 1 to the image-side surface 76 of the seventh lens element 7 of the sixth embodiment in Formula (1) above.

In addition, the relationships between important parameters in the optical imaging lens 10 of the sixth embodiment are as shown in FIG. 30.

The longitudinal spherical aberration of the sixth embodiment is as shown in FIG. 27A, and deviations of imaging points of off-axis rays at different heights are controlled within a range of ±0.04 mm. In the two field curvature aberration diagrams of FIG. 27B and FIG. 27C, focal length variations of the three representative wavelengths within the entire field of view range fall within ±0.08 mm. The distortion aberration diagram of FIG. 27D shows that the distortion aberration of this embodiment is maintained within a range of ±3%.

From the above description, it can be known that the image height of the sixth embodiment is greater than the image height of the first embodiment. Therefore, compared with the first embodiment, the sixth embodiment has better sensitivity.

Then, referring to FIG. 30 in conjunction, FIG. 30 shows a table diagram of various optical parameters of the first embodiment to the sixth embodiment. When the first lens element 1 has positive refracting power, the periphery region 153 of the object-side surface 15 of the first lens element 1 is convex, and the periphery region 253 of the object-side surface 25 of the second lens element 2 is convex, the surface shape design of the first lens element 1 and the second lens element 2 can effectively collect imaging rays at a large angle, so that the rays at a large angle can enter the optical system, achieving expansion of the field of view. In addition, when in conjunction with that the fourth lens element 4 has positive refracting power, the periphery region 453 of the object-side surface 45 of the fourth lens element 4 is convex, the optical axis region 561 of the image-side surface 56 of the fifth lens element 5 is convex, the optical axis region 651 of the object-side surface 65 of the sixth lens element 6 is convex, the optical axis region 661 of the image-side surface 66 of the sixth lens element 6 is concave, and the optical axis region 751 of the object-side surface 75 of the seventh lens element 7 is concave, the overall distortion and optical aberration of the optical imaging lens 10 can be improved. Further, in conjunction with that the material combination of V3+V4+V5+V6+V7≤195.000, the chromatic aberration caused by the first lens element 1 and the second lens element 2 can be further alleviated, so that the optical imaging lens 10 has good imaging quality. A preferable range of V3+V4+V5+V6+V7 is 135.000≤V3+V4+V5+V6+V7≤195.000.

In addition, when the first lens element 1 has positive refracting power, and the periphery region 153 of the object-side surface 15 of the first lens element 1 is convex, the surface shape design of the first lens element 1 can allow rays at a large angle to smoothly enter the optical imaging system. When in conjunction with that the periphery region 353 of the object-side surface 35 of the third lens element 3 is concave, the deflection direction of the rays can be corrected to reduce optical aberration at the edge. Further, when in conjunction with that the fourth lens element 4 has positive refracting power, the periphery region 453 of the object-side surface 45 of the fourth lens element 4 is convex, the optical axis region 551 of the object-side surface 55 of the fifth lens element 5 is concave, the optical axis region 661 of the image-side surface 66 of the sixth lens element 6 is concave, and the optical axis region 751 of the object-side surface 75 of the seventh lens element 7 is concave, the overall distortion and optical aberration of the optical imaging lens 10 can be improved. When the materials of the fourth lens element 4 to the seventh lens element 7 further satisfy V4+V5+V6+V7≤170.000, the chromatic aberration can be effectively alleviated and unnecessary stray rays can be reduced. A preferable implementation range of V4+V5+V6+V7 is 120.000≤V4+V5+V6+V7≤170.000.

In addition, when the first lens element 1 has positive refracting power, rays at a large angle can smoothly enter the optical imaging system. When in conjunction with that the fourth lens element has positive refracting power, the periphery region 453 of the object-side surface 45 of the fourth lens element 4 is convex, the optical axis region 651 of the object-side surface 65 of the sixth lens element 6 is convex, the optical axis region 661 of the image-side surface 66 of the sixth lens element 6 is concave, and the optical axis region 751 of the object-side surface 75 of the seventh lens element 7 is concave, the overall distortion and optical aberration of the optical imaging lens 10 can be improved. When the materials of the fourth lens element 4 to the seventh lens element 7 satisfy V4+V5+V6+V7≤170.000, the chromatic aberration can be effectively alleviated and unnecessary stray rays can be reduced. In conjunction with a ratio limitation of D22t71/D42t61≥3.600, the volume of the optical imaging lens can be effectively controlled, achieving light weighting. Preferable ranges of V4+V5+V6+V7 and D22t71/D42t61 are respectively 120.000≤V4+V5+V6+V7≤170.000, and 3.600 D22t71/D42t61≤8.600.

In addition, when the image height of the optical imaging lens 10 satisfies the following proportional relationships, it helps to increase the pixel and resolution of the optical imaging lens 10, where the optical imaging lens 10 satisfies (EFL+TL)/ImgH≤3.000, with a preferable range of 2.100≤(EFL+TL)/ImgH≤3.000;

the optical imaging lens 10 satisfies ImgH/Fno≥2.000 mm, with a preferable range of 2.000 mm≤ImgH/Fno≤4.000 mm;

the optical imaging lens 10 satisfies ImgH/Fno≥3.000 mm, with a preferable range of 3.000 mm≤ImgH/Fno≤4.000 mm;

the optical imaging lens 10 satisfies (TTL+ImgH)/BFL≥13.000, with a preferable range of 13.000≤(TTL+ImgH)/BFL≤33.000;

the optical imaging lens 10 satisfies (TL+ImgH)/AAG≥3.850, with a preferable range of 3.850≤(TL+ImgH)/AAG≤5.200;

the optical imaging lens 10 satisfies (EFL+ImgH)/Tmax≥9.600, with a preferable range of 9.600≤(EFL+ImgH)/Tmax≤14.500;

the optical imaging lens 10 satisfies (EFL+ImgH)/Tmax≥5.900, with a preferable range of 5.900≤(EFL+ImgH)/Tmax≤14.500;

the optical imaging lens 10 satisfies ImgH/(AAG+BFL)≥1.200, with a preferable range of 1.200≤ImgH/(AAG+BFL)≤1.800

In addition, to reduce the system length of the optical imaging lens 10 and ensure the imaging quality, while considering the difficulty of manufacturing, the air gaps between the lens elements or the thicknesses of the lens elements may be appropriately reduced or maintained at a certain ratio. When the numerical limitations of the following conditional expressions are satisfied, the embodiments of the disclosure can have a better configuration,
where
the optical imaging lens 10 satisfies ALT/Gmax≤4.600, with a preferable range of 2.500≤ALT/Gmax≤4.600;
the optical imaging lens 10 satisfies (T6+G67)/T5≥2.900, with a preferable range of 2.900≤(T6+G67)/T5≤6.750;
the optical imaging lens 10 satisfies TTL/(T2+G45) ≥9.900, with a preferable range of 9.900≤TTL/(T2+G45)≤21.200;
the optical imaging lens 10 satisfies Tmax/Tmin≤3.500, with a preferable range of 2.600≤Tmax/Tmin≤3.500;
the optical imaging lens 10 satisfies Tmax/Tmin≤5.000, with a preferable range of 2.600≤Tmax/Tmin≤5.000;
the optical imaging lens 10 satisfies EFL/Gmax≤5.650, with a preferable range of 3.400≤EFL/Gmax≤5.650;
the optical imaging lens 10 satisfies (G45+T7)/T6≤1.500, with a preferable range of 0.400≤(G45+T7)/T6≤1.500;
the optical imaging lens 10 satisfies ALT/(G12+G23+G67)≤2.500, with a preferable range of 1.450≤ALT/(G12+G23+G67)≤2.500;
the optical imaging lens 10 satisfies (T1+T3)/(G12+G34+G45)≤2.200, a preferable range is 2.200≤(T1+T3)/(G12+G34+G45)≤4.400;
the optical imaging lens 10 satisfies TTL/Gmax≤7.700, with a preferable range of 4.800≤TTL/Gmax≤7.700;
the optical imaging lens 10 satisfies (T5+G56+T7)/T1≤1.850, with a preferable range of 0.900≤(T5+G56+T7)/T1≤1.850;
the optical imaging lens 10 satisfies TL/(T4+G45)≥5.300, with a preferable range of 5.300≤TL/(T4+G45)≤6.900;
the optical imaging lens 10 satisfies TL/(T4+G45)≥4.500, with a preferable range of 4.500≤TL/(14+G45)≤6.900

In addition, any combinational relationship between the parameters of the embodiments may be additionally selected to add limitations on lenses to help with design of lenses with the same structure of the disclosure.

In view of the unpredictability of optical system design, under the architecture of the disclosure, satisfying the above conditional expressions can better expand the field of view, increase the image height, reduce the f-number, improve the imaging quality, or improve the assembly yield rate in the disclosure over the prior art. Moreover, the use of plastic material for the lens element in the embodiments of the disclosure can further reduce the weight and cost of the lens.

The numerical range including the maximum value and the minimum value obtained from the combinational and proportional relationships between the optical parameters disclosed in the embodiments of the disclosure can be implemented accordingly.

In summary of the foregoing, the optical imaging lens of the embodiments of the disclosure can achieve the following:

I. The longitudinal spherical aberrations, the astigmatic aberrations, and the distortions of the embodiments of the disclosure comply with the usage specification. In addition, the off-axis rays at different heights at the three representative wavelengths of red, green and blue are concentrated near the imaging points. It can be seen from the deflection amplitude of each curve that deviations of imaging points of the off-axis rays at different heights are controlled to achieve good spherical aberration, optical aberration, and distortion suppression capability. Further, with reference to the imaging quality data, the distances between the three representative wavelengths of red, green and blue are also quite close to each other, which indicates favorable concentricity of rays at different wavelengths and good chromatic dispersion suppression capability in the disclosure. In summary of the above, with the design and combination of the lens elements, a favorable imaging quality is achieved.

II. In the optical imaging lens of the embodiments of the disclosure, when the first lens element has positive refracting power, the periphery region of the object-side surface of the first lens element is convex, and the periphery region of the object-side surface of the second lens element is convex, imaging rays at a large angle can be effectively collected to achieve expansion of the field of view. When in conjunction with that the fourth lens element has positive refracting power, the periphery region of the object-side surface of the fourth lens element is convex, the optical axis region of the image-side surface of the fifth lens element is convex, the optical axis region of the object-side surface of the sixth lens element is convex, the optical axis region of the image-side surface of the sixth lens element is concave, and the optical axis region of the object-side surface of the seventh lens element is concave, the overall distortion and optical aberration of the optical imaging lens can be improved. Further, in conjunction with that V3+V4+V5+V6+V7≤195.000, the chromatic aberration caused by the first lens element and the second lens element can be further alleviated, so that the optical imaging lens has good imaging quality.

III. In the optical imaging lens of the embodiments of the disclosure, when the first lens element has positive refracting power, and the periphery region of the object-side surface of the first lens element is convex, rays at a large angle can smoothly enter the optical imaging system. When in conjunction with that the periphery region of the object-side surface with the third lens element is concave, the deflection direction of the rays can be corrected to reduce optical aberration at the edge. Further, when in conjunction with that the fourth lens element has positive refracting power, the periphery region of the object-side surface of the fourth lens element is convex, the optical axis region of the object-side surface of the fifth lens element is concave, the optical axis region of the image-side surface of the sixth lens element is concave, and the optical axis region of the object-side surface of the seventh lens element is concave, the overall distortion and optical aberration of the optical imaging lens can be improved. When the materials of the fourth lens element to the seventh lens element further satisfy V4+V5+V6+V7≤170.000, the chromatic aberration can be effectively alleviated and unnecessary stray rays can be reduced.

IV. In the optical imaging lens of the embodiments of the disclosure, when the first lens element has positive refracting power, rays at a large angle can smoothly enter the optical imaging system. When in conjunction with that the fourth lens element has positive refracting power, the periphery region of the object-side surface of the fourth lens element is convex, the optical axis region of the object-side surface of the sixth lens element is convex, the optical axis region of the image-side surface of the sixth lens element is concave, and the optical axis region of the object-side surface of the seventh lens element is concave, the overall distortion and optical aberration of the optical imaging lens can be improved. When the materials of the fourth lens element to the seventh lens element satisfy V4+V5+V6+V7≤170.000, the chromatic aberration can be effectively alleviated and unnecessary stray rays can be reduced. In conjunction with a ratio limitation of D22t71/

D42t61≥3.600, the volume of the optical imaging lens can be effectively controlled, achieving light weighting.

V. The adoption of aspheric design for the lens elements of the embodiments of the disclosure helps to render favorable imaging quality.

VI. The selection of plastic materials for the lens elements of the embodiments of the disclosure helps with light weighting, and can further reduce the weight and cost of the optical imaging lens.

The contents in the embodiments of the invention include but are not limited to a focal length, a thickness of a lens element, an Abbe number, or other optical parameters. For example, in the embodiments of the invention, an optical parameter A and an optical parameter B are disclosed, wherein the ranges of the optical parameters, comparative relation between the optical parameters, and the range of a conditional expression covered by a plurality of embodiments are specifically explained as follows:

(1) The ranges of the optical parameters are, for example, $\alpha_2 \leq A \leq \alpha_1$ or $\beta_2 \leq B \leq \beta_1$, where $\alpha_1$ is a maximum value of the optical parameter A among the plurality of embodiments, $\alpha_2$ is a minimum value of the optical parameter A among the plurality of embodiments, $\beta_1$ is a maximum value of the optical parameter B among the plurality of embodiments, and $\beta_2$ is a minimum value of the optical parameter B among the plurality of embodiments.

(2) The comparative relation between the optical parameters is that A is greater than B or A is less than B, for example.

(3) The range of a conditional expression covered by a plurality of embodiments is in detail a combination relation or proportional relation obtained by a possible operation of a plurality of optical parameters in each same embodiment. The relation is defined as E, and E is, for example, A+B or A−B or A/B or A*B or $(A*B)^{1/2}$, and E satisfies a conditional expression $E \leq \gamma_1$ or $E \geq \gamma_2$ or $\gamma_2 \leq E \leq \gamma_1$, where each of $\gamma_1$ and $\gamma_2$ is a value obtained by an operation of the optical parameter A and the optical parameter B in a same embodiment, $\gamma_1$ is a maximum value among the plurality of the embodiments, and $\gamma_2$ is a minimum value among the plurality of the embodiments.

The ranges of the aforementioned optical parameters, the aforementioned comparative relations between the optical parameters, and a maximum value, a minimum value, and the numerical range between the maximum value and the minimum value of the aforementioned conditional expressions are all implementable and all belong to the scope disclosed by the invention. The aforementioned description is for exemplary explanation, but the invention is not limited thereto.

The embodiments of the invention are all implementable. In addition, a combination of partial features in a same embodiment can be selected, and the combination of partial features can achieve the unexpected result of the invention with respect to the prior art. The combination of partial features includes but is not limited to the surface shape of a lens element, refracting power, a conditional expression or the like, or a combination thereof. The description of the embodiments is for explaining the specific embodiments of the principles of the invention, but the invention is not limited thereto. Specifically, the embodiments and the drawings are for exemplifying, but the invention is not limited thereto.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An optical imaging lens, comprising a first lens element, a second lens element, a third lens element, a fourth lens element, a fifth lens element, a sixth lens element, and a seventh lens element sequentially arranged along an optical axis from an object side to an image side, wherein each of the first lens element to the seventh lens element comprises an object-side surface facing the object side and allowing an imaging ray to pass through and an image-side surface facing the image side and allowing the imaging ray to pass through, wherein the first lens element has positive refracting power and a periphery region of the object-side surface of the first lens element is convex;

a periphery region of the object-side surface of the second lens element is convex;

the fourth lens element has positive refracting power and a periphery region of the object-side surface of the fourth lens element is convex;

an optical axis region of the image-side surface of the fifth lens element is convex;

an optical axis region of the object-side surface of the sixth lens element is convex and an optical axis region of the image-side surface of the sixth lens element is concave; and an optical axis region of the object-side surface of the seventh lens element is concave, wherein lens elements of the optical imaging lens are only the seven lens elements and satisfy V3+V4+V5+V6+V7≤195.000, where V3 is an Abbe number of the third lens element, V4 is an Abbe number of the fourth lens element, V5 is an Abbe number of the fifth lens element, V6 is an Abbe number of the sixth lens element, and V7 is an Abbe number of the seventh lens element.

2. The optical imaging lens according to claim 1, wherein the optical imaging lens further satisfies a condition as follows: (EFL+TL)/ImgH≤3.000, where EFL is an effective focal length of the optical imaging lens, TL is a distance from the object-side surface of the first lens element to the image-side surface of the seventh lens element on the optical axis, and ImgH is an image height of the optical imaging lens.

3. The optical imaging lens according to claim 1, wherein the optical imaging lens further satisfies a condition as follows: ImgH/Fno≥3.000 mm, where ImgH is an image height of the optical imaging lens, and Fno is an f-number of the optical imaging lens.

4. The optical imaging lens according to claim 1, wherein the optical imaging lens further satisfies a condition as follows: ALT/Gmax≤4.600, where ALT is a sum of thicknesses of the seven lens elements from the first lens element to the seventh lens element on the optical axis, and Gmax is a maximum value of six air gaps between the first lens element to the seventh lens element on the optical axis.

5. The optical imaging lens according to claim 1, wherein the optical imaging lens further satisfies a condition as follows: (T6+G67)/T5≥2.900, where T6 is a thickness of the sixth lens element on the optical axis, G67 is an air gap between the sixth lens element and the seventh lens element on the optical axis, and T5 is a thickness of the fifth lens element on the optical axis.

6. The optical imaging lens according to claim 1, wherein the optical imaging lens further satisfies a condition as follows: TTL/(T2+G45)≥9.900, where TTL is a distance from the object-side surface of the first lens element to an image plane on the optical axis, T2 is a thickness of the second lens element on the optical axis, and G45 is an air gap between the fourth lens element and the fifth lens element on the optical axis.

7. The optical imaging lens according to claim 1, wherein the optical imaging lens further satisfies a condition as follows: Tmax/Tmin≤3.500, where Tmax is a maximum value of thicknesses of the seven lens elements from the first lens element to the seventh lens element on the optical axis, and Tmin is a minimum value of the thicknesses of the seven lens elements from the first lens element to the seventh lens element on the optical axis.

8. An optical imaging lens, comprising a first lens element, a second lens element, a third lens element, a fourth lens element, a fifth lens element, a sixth lens element, and a seventh lens element sequentially arranged along an optical axis from an object side to an image side, wherein each of the first lens element to the seventh lens element comprises an object-side surface facing the object side and allowing an imaging ray to pass through and an image-side surface facing the image side and allowing the imaging ray to pass through, wherein
   the first lens element has positive refracting power and a periphery region of the object-side surface of the first lens element is convex;
   a periphery region of the object-side surface of the third lens element is concave;
   the fourth lens element has positive refracting power and a periphery region of the object-side surface of the fourth lens element is convex;
   an optical axis region of the object-side surface of the fifth lens element is concave;
   an optical axis region of the image-side surface of the sixth lens element is concave; and
   an optical axis region of the object-side surface of the seventh lens element is concave,
   wherein lens elements of the optical imaging lens are only the seven lens elements and satisfy V4+V5+V6+V7≤170.000, where V4 is an Abbe number of the fourth lens element, V5 is an Abbe number of the fifth lens element, V6 is an Abbe number of the sixth lens element, and V7 is an Abbe number of the seventh lens element.

9. The optical imaging lens according to claim 8, wherein the optical imaging lens further satisfies a condition as follows: (TTL+ImgH)/BFL≥13.000, where TTL is a distance from the object-side surface of the first lens element to an image plane on the optical axis, ImgH is an image height of the optical imaging lens, and BFL is a distance from the image-side surface of the seventh lens element to the image plane on the optical axis.

10. The optical imaging lens according to claim 8, wherein the optical imaging lens further satisfies a condition as follows: (TL+ImgH)/AAG≥3.850, where TL is a distance from the object-side surface of the first lens element to the image-side surface of the seventh lens element on the optical axis, ImgH is an image height of the optical imaging lens, and AAG is a sum of six air gaps between the first lens element to the seventh lens element on the optical axis.

11. The optical imaging lens according to claim 8, wherein the optical imaging lens further satisfies a condition as follows: EFL/Gmax≤5.650, where EFL is an effective focal length of the optical imaging lens, and Gmax is a maximum value of six air gaps between the first lens element to the seventh lens element on the optical axis.

12. The optical imaging lens according to claim 8, wherein the optical imaging lens further satisfies a condition as follows: (G45+T7)/T6≤1.500, where G45 is an air gap between the fourth lens element and the fifth lens element on the optical axis, T7 is a thickness of the seventh lens element on the optical axis, and T6 is a thickness of the sixth lens element on the optical axis.

13. The optical imaging lens according to claim 8, wherein the optical imaging lens further satisfies a condition as follows: ALT/(G12+G23+G67)≤2.500, where ALT is a sum of thicknesses of the seven lens elements from the first lens element to the seventh lens element on the optical axis, G12 is an air gap between the first lens element and the second lens element on the optical axis, G23 is an air gap between the second lens element and the third lens element on the optical axis, and G67 is an air gap between the sixth lens element and the seventh lens element on the optical axis.

14. The optical imaging lens according to claim 8, wherein the optical imaging lens further satisfies a condition as follows: (T1+T3)/(G12+G34+G45)≥2.200, where T1 is a thickness of the first lens element on the optical axis, T3 is a thickness of the third lens element on the optical axis, G12 is an air gap between the first lens element and the second lens element on the optical axis, G34 is an air gap between the third lens element and the fourth lens element on the optical axis, and G45 is an air gap between the fourth lens element and the fifth lens element on the optical axis.

15. An optical imaging lens, comprising a first lens element, a second lens element, a third lens element, a fourth lens element, a fifth lens element, a sixth lens element, and a seventh lens element sequentially arranged along an optical axis from an object side to an image side, wherein each of the first lens element to the seventh lens element comprises an object-side surface facing the object side and allowing an imaging ray to pass through and an image-side surface facing the image side and allowing the imaging ray to pass through, wherein
   the first lens element has positive refracting power;
   the fourth lens element has positive refracting power and a periphery region of the object-side surface of the fourth lens element is convex;
   an optical axis region of the object-side surface of the sixth lens element is convex and an optical axis region of the image-side surface of the sixth lens element is concave; and
   an optical axis region of the object-side surface of the seventh lens element is concave,
   wherein lens elements of the optical imaging lens are only the seven lens elements and satisfy V4+V5+V6+V7≤170.000, and D22t71/D42t61≥3.600, where V4 is an Abbe number of the fourth lens element, V5 is an Abbe number of the fifth lens element, V6 is an Abbe number of the sixth lens element, V7 is an Abbe number of the seventh lens element, D22t71 is a distance from the image-side surface of the second lens element to the object-side surface of the seventh lens element on the optical axis, and D42t61 is a distance from the image-side surface of the fourth lens element to the object-side surface of the sixth lens element on the optical axis.

16. The optical imaging lens according to claim 15, wherein the optical imaging lens further satisfies a condition as follows: (EFL+ImgH)/Tmax≥9.600, where EFL is an effective focal length of the optical imaging lens, ImgH is an image height of the optical imaging lens, and Tmax is a maximum value of thicknesses of the seven lens elements from the first lens element to the seventh lens element on the optical axis.

17. The optical imaging lens according to claim 15, wherein the optical imaging lens further satisfies a condition as follows: ImgH/(AAG+BFL)≥1.200, where ImgH is an image height of the optical imaging lens, AAG is a sum of six air gaps between the first lens element to the seventh lens element on the optical axis, and BFL is a distance from the image-side surface of the seventh lens element to an image plane on the optical axis.

18. The optical imaging lens according to claim 15, wherein the optical imaging lens further satisfies a condition as follows: TTL/Gmax≤7.700, where TTL is a distance from the object-side surface of the first lens element to an image plane on the optical axis, and Gmax is a maximum value of six air gaps between the first lens element to the seventh lens element on the optical axis.

19. The optical imaging lens according to claim 15, wherein the optical imaging lens further satisfies a condition as follows: (T5+G56+T7)/T1≤1.850, where T5 is a thickness of the fifth lens element on the optical axis, G56 is an air gap between the fifth lens element and the sixth lens element on the optical axis, T7 is a thickness of the seventh lens element on the optical axis, and T1 is a thickness of the first lens element on the optical axis.

20. The optical imaging lens according to claim 15, wherein the optical imaging lens further satisfies a condition as follows: TL/(T4+G45)≥5.300, where TL is a distance from the object-side surface of the first lens element to the image-side surface of the seventh lens element on the optical axis, T4 is a thickness of the fourth lens element on the optical axis, and G45 is an air gap between the fourth lens element and the fifth lens element on the optical axis.

\* \* \* \* \*